United States Patent
Honma et al.

(10) Patent No.: US 12,068,097 B2
(45) Date of Patent: Aug. 20, 2024

(54) LAMINATED CORE, CORE BLOCK, ELECTRIC MOTOR AND METHOD OF PRODUCING CORE BLOCK

(71) Applicant: NIPPON STEEL CORPORATION, Tokyo (JP)

(72) Inventors: Rei Honma, Tokyo (JP); Ryu Hirayama, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 120 days.

(21) Appl. No.: 17/295,781

(22) PCT Filed: Dec. 17, 2019

(86) PCT No.: PCT/JP2019/049289
§ 371 (c)(1),
(2) Date: May 20, 2021

(87) PCT Pub. No.: WO2020/129938
PCT Pub. Date: Jun. 25, 2020

(65) Prior Publication Data
US 2021/0343466 A1 Nov. 4, 2021

(30) Foreign Application Priority Data

Dec. 17, 2018 (JP) .................................. 2018-235856
Dec. 17, 2018 (JP) .................................. 2018-235872
(Continued)

(51) Int. Cl.
*H01F 27/245* (2006.01)
*H01F 27/26* (2006.01)
(Continued)

(52) U.S. Cl.
CPC ......... *H01F 27/245* (2013.01); *H01F 27/263* (2013.01); *H02K 15/024* (2013.01); *H01F 27/25* (2013.01)

(58) Field of Classification Search
CPC ...... H01F 27/245; H01F 27/25; H01F 27/263; H01F 3/02; H02K 1/04; H02K 1/148; H02K 1/185; H02K 2213/03
(Continued)

(56) References Cited

U.S. PATENT DOCUMENTS 3,386,058 A * 5/1968 Michel ................. H01F 27/303
336/185
4,025,379 A * 5/1977 Whetstone .......... H01F 41/0233
336/219
(Continued)

FOREIGN PATENT DOCUMENTS

CN 102792556 A 11/2012
EP 3553799 A1 10/2019
(Continued)

OTHER PUBLICATIONS

Matweb, "Plaskolite West Optix® CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).
(Continued)

*Primary Examiner* — Alex W Mok
(74) *Attorney, Agent, or Firm* — Renner, Otto, Boisselle & Sklar, LLP

(57) ABSTRACT

A laminated core according to an aspect of the present invention includes a plurality of electrical steel sheets stacked to each other; and a plurality of adhesion parts that are provided between the electrical steel sheets adjacent to each other in a stacking direction and adhere the electrical
(Continued)

steel sheets to each other, in which, when viewed in the stacking direction, the plurality of adhesion parts are formed in a belt shape that extends in a first direction, the plurality of adhesion parts are arranged in a second direction orthogonal to the first direction, and an angle formed by the first direction and a rolling direction of the electrical steel sheet is 30° or more and 90° or less.

27 Claims, 8 Drawing Sheets

(30) Foreign Application Priority Data

Jun. 26, 2019 (JP) .................. 2019-118338
Jun. 26, 2019 (JP) .................. 2019-118339

(51) Int. Cl.
*H02K 15/02* (2006.01)
*H01F 27/25* (2006.01)

(58) Field of Classification Search
USPC .................................. 310/216.004
See application file for complete search history.

(56) References Cited

U.S. PATENT DOCUMENTS

| | | | |
|---|---|---|---|
| 4,103,195 A * | 7/1978 | Torossian | H02K 1/04 310/216.065 |
| 4,413,406 A * | 11/1983 | Bennett | H01F 27/25 29/609 |
| 5,142,178 A | 8/1992 | Kloster et al. | |
| 5,248,405 A | 9/1993 | Kaneda et al. | |
| 5,338,996 A | 8/1994 | Yamamoto | |
| 5,448,119 A | 9/1995 | Kono et al. | |
| 5,994,464 A | 11/1999 | Ohsawa et al. | |
| 6,495,936 B2 | 12/2002 | Kikuchi et al. | |
| 6,653,758 B2 | 11/2003 | Tsuneyoshi et al. | |
| 7,298,064 B2 * | 11/2007 | Yamamoto | H02K 15/03 310/216.057 |
| 7,562,439 B2 * | 7/2009 | Yamamoto | H02K 1/16 29/598 |
| 7,859,163 B2 | 12/2010 | Bertocchi et al. | |
| 7,952,254 B2 | 5/2011 | Cho et al. | |
| 7,960,890 B2 * | 6/2011 | Miyake | H02K 15/022 310/43 |
| 8,015,691 B2 * | 9/2011 | Miyake | H02K 15/022 310/43 |
| 8,580,217 B2 | 11/2013 | Hipszki et al. | |
| 8,581,468 B2 | 11/2013 | Kudose et al. | |
| 8,697,811 B2 | 4/2014 | Kishi et al. | |
| 8,943,677 B2 | 2/2015 | Gerster et al. | |
| 9,331,530 B2 | 5/2016 | Jang et al. | |
| 9,512,335 B2 | 12/2016 | Hoshi et al. | |
| 9,770,949 B2 | 9/2017 | Fudemoto et al. | |
| 9,833,972 B2 | 12/2017 | Ohishi et al. | |
| 10,340,754 B2 | 7/2019 | Ogino et al. | |
| 10,348,170 B2 | 7/2019 | Izumi et al. | |
| 10,476,321 B2 | 11/2019 | Li et al. | |
| 10,491,059 B2 | 11/2019 | Murakami et al. | |
| 10,547,225 B2 | 1/2020 | Hattori et al. | |
| 10,574,112 B2 | 2/2020 | Tomonaga | |
| 10,819,201 B2 | 10/2020 | Thumm et al. | |
| 10,840,749 B2 | 11/2020 | Chaillou et al. | |
| 11,056,934 B2 | 7/2021 | Kubota et al. | |
| 11,616,407 B2 | 3/2023 | Hino et al. | |
| 2002/0047459 A1 | 4/2002 | Adaeda et al. | |
| 2002/0163277 A1 | 11/2002 | Miyake et al. | |
| 2004/0056556 A1 | 3/2004 | Fujita | |
| 2004/0124733 A1 | 7/2004 | Yamamoto et al. | |
| 2006/0043820 A1 * | 3/2006 | Nakahara | H02K 1/02 310/254.1 |
| 2007/0024148 A1 | 2/2007 | Maita et al. | |
| 2007/0040467 A1 | 2/2007 | Gu | |
| 2007/0182268 A1 | 8/2007 | Hashiba et al. | |
| 2009/0026873 A1 | 1/2009 | Matsuo et al. | |
| 2009/0195110 A1 | 8/2009 | Miyaki | |
| 2009/0230812 A1 | 9/2009 | Cho et al. | |
| 2010/0090560 A1 | 4/2010 | Myojin | |
| 2010/0197830 A1 | 8/2010 | Hayakawa et al. | |
| 2010/0219714 A1 | 9/2010 | Abe et al. | |
| 2010/0244617 A1 | 9/2010 | Nobata et al. | |
| 2011/0180216 A1 * | 7/2011 | Miyake | H02K 1/08 156/510 |
| 2011/0269894 A1 | 11/2011 | Miyamoto | |
| 2012/0088096 A1 | 4/2012 | Takeda et al. | |
| 2012/0128926 A1 | 5/2012 | Ohishi et al. | |
| 2012/0156441 A1 * | 6/2012 | Gerster | H01F 1/18 156/60 |
| 2012/0235535 A1 | 9/2012 | Watanabe | |
| 2012/0288659 A1 | 11/2012 | Hoshi et al. | |
| 2013/0244029 A1 | 9/2013 | Igarashi et al. | |
| 2014/0023825 A1 | 1/2014 | Igarashi et al. | |
| 2015/0028717 A1 | 1/2015 | Luo et al. | |
| 2015/0097463 A1 | 4/2015 | Blocher et al. | |
| 2015/0130318 A1 | 5/2015 | Kitada et al. | |
| 2015/0256037 A1 | 9/2015 | Kudose | |
| 2015/0337106 A1 | 11/2015 | Kajihara | |
| 2016/0023447 A1 | 1/2016 | Shimizu | |
| 2016/0352159 A1 | 12/2016 | Li et al. | |
| 2016/0352165 A1 | 12/2016 | Fubuki | |
| 2017/0117758 A1 | 4/2017 | Nakagawa | |
| 2017/0287625 A1 * | 10/2017 | Ito | H01F 27/2847 |
| 2017/0342519 A1 | 11/2017 | Uesaka et al. | |
| 2017/0368590 A1 | 12/2017 | Senda et al. | |
| 2018/0030292 A1 | 2/2018 | Gotou | |
| 2018/0056629 A1 | 3/2018 | Hamamura | |
| 2018/0134926 A1 | 5/2018 | Lei et al. | |
| 2018/0159389 A1 | 6/2018 | Nishikawa | |
| 2018/0212482 A1 | 7/2018 | Nigo | |
| 2018/0248420 A1 | 8/2018 | Enokizono et al. | |
| 2018/0295678 A1 | 10/2018 | Okazaki et al. | |
| 2018/0309330 A1 * | 10/2018 | Ueda | H02K 29/03 |
| 2018/0342925 A1 | 11/2018 | Horii et al. | |
| 2019/0010361 A1 | 1/2019 | Hoshi | |
| 2019/0040183 A1 | 2/2019 | Yoshida et al. | |
| 2020/0048499 A1 | 2/2020 | Andou et al. | |
| 2020/0099263 A1 | 3/2020 | Hirosawa et al. | |
| 2020/0186014 A1 | 6/2020 | Kusuyama | |
| 2021/0296975 A1 | 9/2021 | Hino et al. | |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 U | 12/1985 |
| JP | 62-009951 A | 1/1987 |
| JP | 63-207639 A | 8/1988 |
| JP | 03-124247 A | 5/1991 |
| JP | 03-247683 A | 11/1991 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |

(56) References Cited

FOREIGN PATENT DOCUMENTS

| | | |
|---|---|---|
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2017-0087915 A | 7/2017 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan, RM-92-79, 1992.
Datasheet of Nylon 6, Cast (Year: N/A, Printed Jun. 28, 2023).

* cited by examiner

LAMINATED CORE, CORE BLOCK, ELECTRIC MOTOR AND METHOD OF PRODUCING CORE BLOCK

TECHNICAL FIELD

The present invention relates to a laminated core, a core block, an electric motor and a method of producing a core block.

Priority is claimed on Japanese Patent Application No. 2018-235856, filed Dec. 17, 2018, Japanese Patent Application No. 2018-235872, filed Dec. 17, 2018, Japanese Patent Application No. 2019-118338, filed Jun. 26, 2019, and Japanese Patent Application No. 2019-118339, filed Jun. 26, 2019, the content of which is incorporated herein by reference.

BACKGROUND ART

In the related art, a laminated core as described in Patent Document 1 below is known. In the laminated core, electrical steel sheets adjacent to each other in a stacking direction are adhered by adhesive layers.

CITATION LIST

Patent Document

[Patent Document 1]
Japanese Unexamined Patent Application, First Publication No. 2011-023523

SUMMARY OF THE INVENTION

Problems to be Solved by the Invention

There is room for improvement in improving the magnetic properties of the laminated core of the related art.

The present invention has been made in view of the above circumstances and an object of the present invention is to improve magnetic properties of a laminated core.

Means for Solving the Problem

In order to address the above problem, the present invention provides the following aspects.

(1) According to an aspect of the present invention, there is provided a laminated core including a plurality of electrical steel sheets stacked to each other; and a plurality of adhesion parts that are provided between the electrical steel sheets adjacent to each other in a stacking direction and adhere the electrical steel sheets to each other, in which, when viewed in the stacking direction, the plurality of adhesion parts are formed in a belt shape that extends in a first direction, the plurality of adhesion parts are arranged in a second direction orthogonal to the first direction, and an angle formed by the first direction and a rolling direction of the electrical steel sheet is 30° or more and 90° or less.

(2) In the laminated core according to (1), the angle formed by the first direction and the rolling direction of the electrical steel sheet may be 52.3° or more.

(3) In the laminated core according to (1) or (2), a width dimension of the adhesion part may be smaller than an interval dimension between the adhesion parts adjacent to each other in the second direction.

(4) In the laminated core according to (3), the width dimension of the adhesion part may be 67%±5% with respect to the interval dimension between the adhesion parts adjacent to each other in the second direction.

(5) In the laminated core according to (4), the angle formed by the first direction and the rolling direction of the electrical steel sheet may be 75°±5°.

(6) In the laminated core according to (1) or (2), the width dimension of the adhesion part may be larger than the interval dimension between the adhesion parts adjacent to each other in the second direction.

(7) In the laminated core according to (6), the width dimension of the adhesion part may be 167%±5% with respect to the interval dimension between the adhesion parts adjacent to each other in the second direction, and the angle formed by the first direction and the rolling direction of the electrical steel sheet may be 85° or more.

(8) In the laminated core according to (6), the width dimension of the adhesion part may be 233%±5% with respect to the interval dimension between the adhesion parts adjacent to each other in the second direction, and the angle formed by the first direction and the rolling direction of the electrical steel sheet may be 85° or more.

(9) According to an aspect of the present invention, there is provided a laminated core including a plurality of electrical steel sheets stacked to each other; and a plurality of adhesion parts that are provided between the electrical steel sheets adjacent to each other in a stacking direction and adhere the electrical steel sheets to each other, in which, when viewed in the stacking direction, the plurality of adhesion parts are formed in a belt shape that extends in a first direction, the plurality of adhesion parts are arranged in a second direction orthogonal to the first direction, and a width dimension of the adhesion part is 368% or less with respect to an interval dimension between the adhesion parts adjacent to each other in the second direction.

(10) In the laminated core according to any one of (1) to (9), an average thickness of the adhesion parts may be 1.0 μm to 3.0 μm.

(11) In the laminated core according to any one of (1) to (10), an average tensile modulus of elasticity E of the adhesion parts may be 1,500 MPa to 4,500 MPa.

(12) In the laminated core according to any one of (1) to (11), the adhesion part may be a room temperature adhesion type acrylic-based adhesive containing SGA made of an elastomer-containing acrylic-based adhesive.

(13) According to an aspect of the present invention, there is provided a core block that constitutes a laminated core by linking a plurality of the core blocks in a ring shape, including a plurality of electrical steel sheet pieces stacked to each other; and a plurality of adhesion parts that are provided between the electrical steel sheet pieces adjacent to each other in a stacking direction and adhere the electrical steel sheet pieces to each other, in which, when viewed in the stacking direction, the plurality of adhesion parts are formed in a belt shape that extends in a first direction, the plurality of adhesion parts are arranged in a second direction orthogonal to the first direction, and an angle formed by the first direction and a rolling direction of the electrical steel sheet piece is 45° or more and 90° or less.

(14) In the core block according to (13), the angle formed by the first direction and the rolling direction of the electrical steel sheet piece may be 52.3° or more.

(15) The core block according to (13) or (14) may include an arc-shaped core back part and a tooth part that protrudes from the core back part in a radial direction of the core back part, in which the tooth part extends in the rolling direction.

(16) In the core block according to any one of (13) to (15), the width dimension of the adhesion part may be smaller than an interval dimension between the adhesion parts adjacent to each other in the second direction.

(17) In the core block according to (16), the width dimension of the adhesion part may be 60% or less with respect to the interval dimension between the adhesion parts adjacent to each other in the second direction.

(18) In the core block according to (17), the width dimension of the adhesion part may be 43% or less with respect to the interval dimension between the adhesion parts adjacent to each other in the second direction.

(19) In the core block according to (17), the width dimension of the adhesion part may be 43%±5% with respect to the interval dimension between the adhesion parts adjacent to each other in the second direction, and the angle formed by the first direction and the rolling direction of the electrical steel sheet piece may be 45° or more.

(20) In the core block according to (16), the width dimension of the adhesion part may be 60%±5% with respect to the interval dimension between the adhesion parts adjacent to each other in the second direction, and the angle formed by the first direction and the rolling direction of the electrical steel sheet piece may be 60° or more.

(21) In the core block according to any one of (13) to (15), the width dimension of the adhesion part may be larger than the interval dimension between the adhesion parts adjacent to each other in the second direction.

(22) In the core block according to (21), the width dimension of the adhesion part may be 150%±5% with respect to the interval dimension between the adhesion parts adjacent to each other in the second direction, and the angle formed by the first direction and the rolling direction of the electrical steel sheet piece may be 85° or more.

(23) In the core block according to any one of (13) to (22), an average thickness of the adhesion parts may be 1.0 μm to 3.0 μm.

(24) In the core block according to any one of (13) to (23), an average tensile modulus of elasticity E of the adhesion parts may be 1,500 MPa to 4,500 MPa.

(25) In the core block according to any one of (13) to (24), the adhesion part may be a room temperature adhesion type acrylic-based adhesive containing SGA made of an elastomer-containing acrylic-based adhesive.

(26) According to an aspect of the present invention, there is provided a laminated core formed by linking the plurality of core blocks according to any one of (13) to (25) in a ring shape.

(27) According to an aspect of the present invention, there is provided an electric motor including the laminated core according to any one of (1) to (12), and (26).

(28) According to an aspect of the present invention, there is provided a method of producing a core block, including: a first process in which a plurality of electrical steel sheet pieces are punched out from an electrical steel sheet; and a second process in which the plurality of electrical steel sheet pieces are stacked with adhesion parts provided therebetween, in which, in the first process, the electrical steel sheet piece is punched out so that a tooth part extends in a rolling direction of the electrical steel sheet, in which, in the second process, the plurality of adhesion parts are formed in a belt shape that extends in a first direction when viewed in a stacking direction, the plurality of adhesion parts are arranged in a second direction orthogonal to the first direction, and the plurality of electrical steel sheet pieces are stacked so that an angle formed by the first direction and the rolling direction is 45° or more and 90° or less.

(29) In the method of producing a core block according to (28), a width dimension of the adhesion part may be smaller than an interval dimension between the adhesion parts adjacent to each other in the second direction.

Effects of the Invention

According to the present invention, it is possible to improve magnetic properties of a laminated core.

EMBODIMENTS FOR IMPLEMENTING THE INVENTION

Hereinafter, an electric motor according to an embodiment of the present invention will be described with reference to the drawings. Here, in the present embodiment, as an electric motor, a motor, specifically an AC motor, more specifically a synchronous motor, and still more specifically a permanent magnetic electric motor will be exemplified. This type of motor is suitably used for, for example, an electric vehicle.

First Embodiment

First, an electric motor 10 of a first embodiment will be described with reference to FIG. 1 to FIG. 4.

Figure 1:
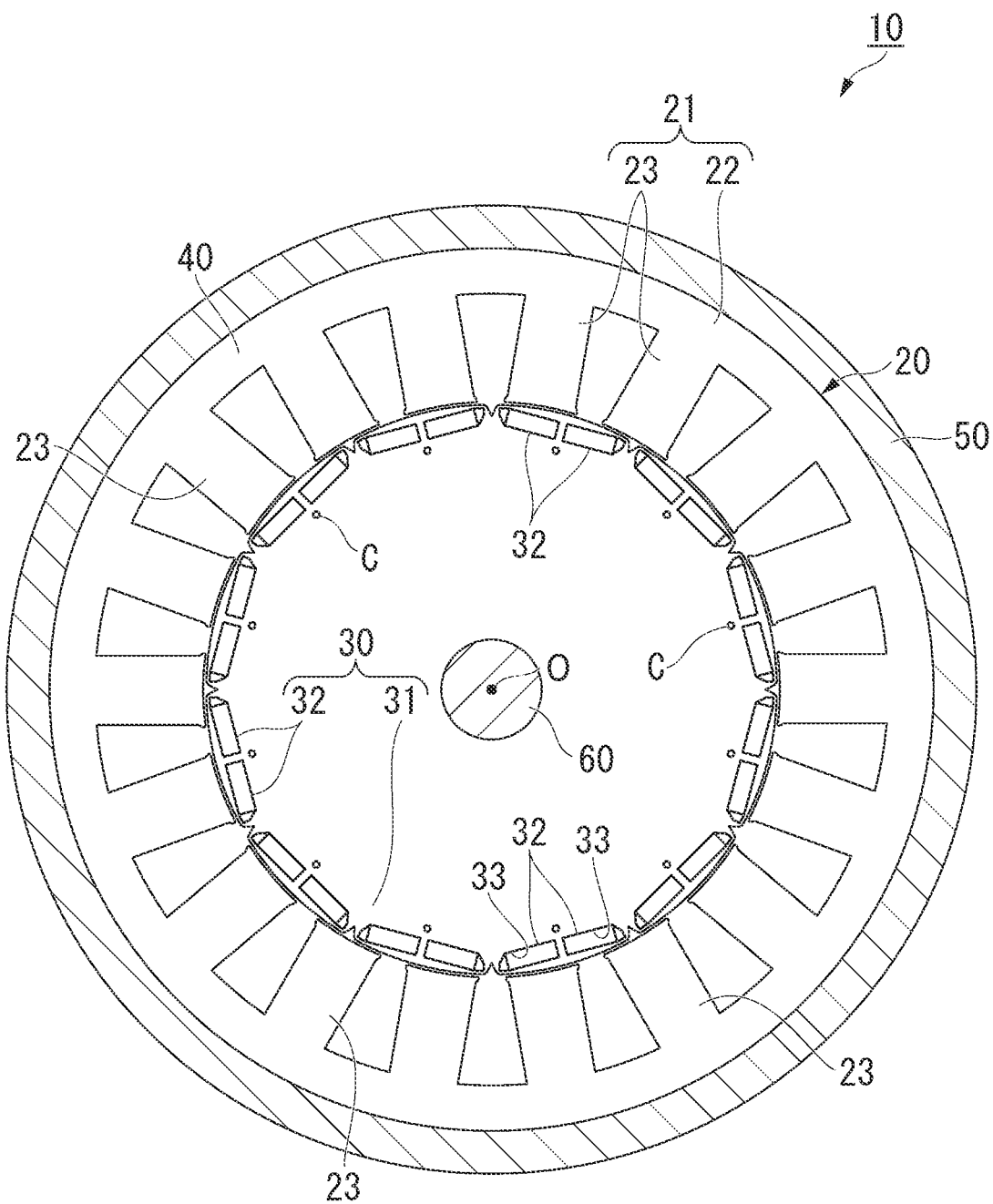
FIG. 1 is a cross-sectional view of an electric motor of a first embodiment.
Figure 2:
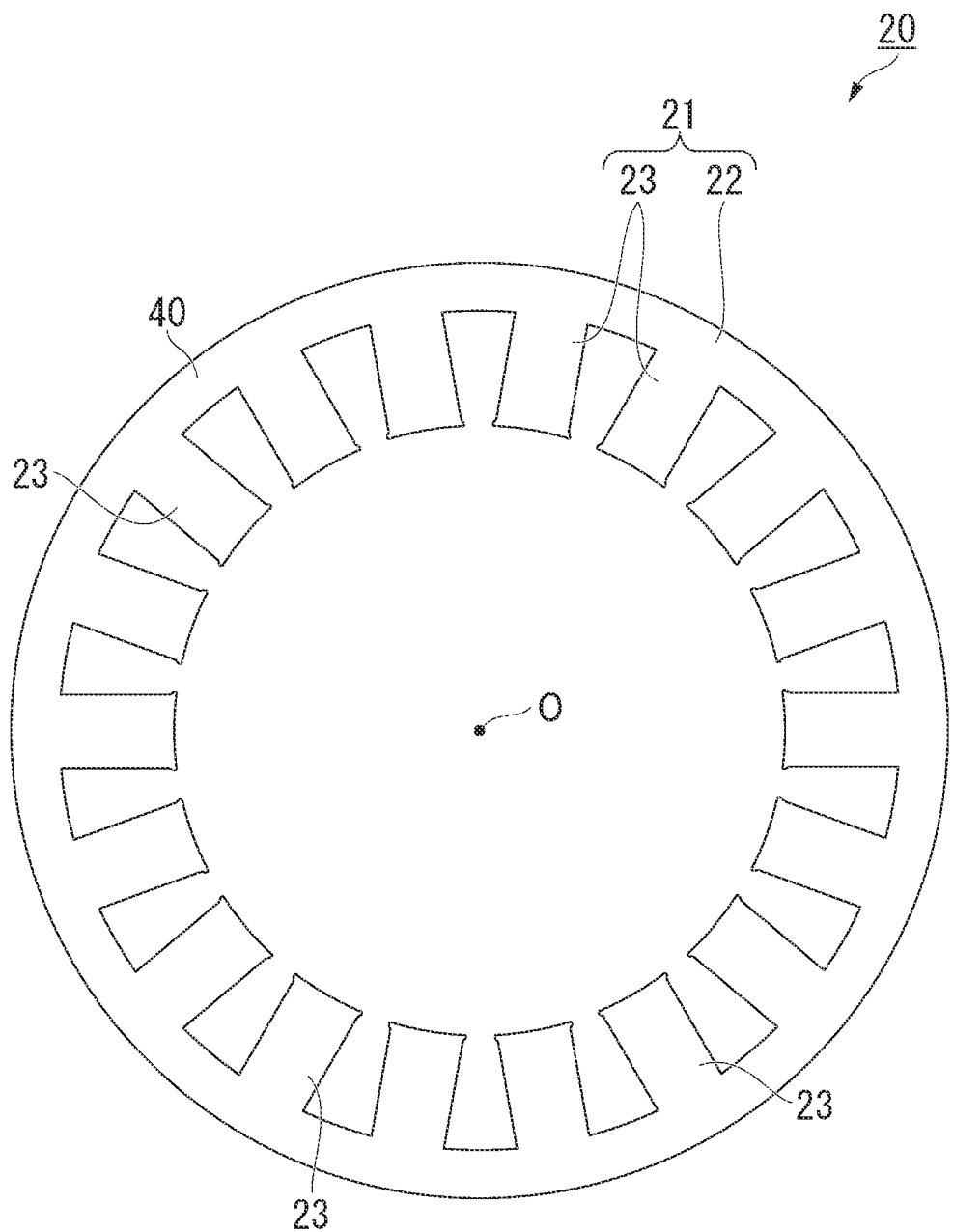
FIG. 2 is a plan view of a stator included in the electric motor of the first embodiment.

As shown in FIG. 1 and FIG. 2, the electric motor 10 of the first embodiment includes a stator 20, a rotor 30, a case 50, and a rotation shaft 60. The stator 20 and the rotor 30 are accommodated in the case 50. The stator 20 is fixed to the case 50.

In the electric motor 10 of the present embodiment, for example, an excitation current with an effective value of 10 A and a frequency of 100 Hz is applied to each phase of the stator 20, and the rotor 30 and the rotation shaft 60 rotate at a rotational speed of 1,000 rpm accordingly.

In the present embodiment, an inner rotor motor in which the rotor 30 is positioned inside the stator 20 is used as the electric motor 10. However, an outer rotor motor in which the rotor 30 is positioned outside the stator 20 may be used as the electric motor 10. In addition, in the present embodiment, the electric motor 10 is a 12-pole 18-slot 3-phase AC motor. However, for example, the number of poles, the number of slots, the number of phases, and the like can be appropriately changed.

The stator 20 includes a stator core (laminated core) 21 and a winding (not shown).

The stator core 21 of the present embodiment is an integrated core. The stator core 21 includes a ring-shaped core back part 22 and a plurality of tooth parts 23. In the following, the axial direction (the central axis O direction of the stator core 21) of the stator core 21 (the core back part 22) will be referred to as an axial direction, and the radial direction (direction orthogonal to the central axis O of the stator core 21) of the stator core 21 (the core back part 22) will be referred to as a radial direction. The circumferential direction (circumferential direction around the central axis O of the stator core 21) of the stator core 21 (the core back part 22) will be referred to as a circumferential direction.

The core back part 22 is formed in an annular shape in a plan view of the stator 20 when viewed in the axial direction.

The plurality of tooth parts 23 protrude from the core back part 22 inward in the radial direction (toward the central axis O of the core back part 22 in the radial direction). The plurality of tooth parts 23 are disposed at equal intervals in the circumferential direction. In the present embodiment, 18 tooth parts 23 are provided at intervals of 20 degrees of the central angle centered on the central axis O. The plurality of tooth parts 23 are formed to have the same shape and the same size.

The winding is wound around the tooth part 23. The winding may be a concentrated winding or a distributed winding.

The rotor 30 is disposed inside the stator 20 (the stator core 21) in the radial direction. The rotor 30 includes a rotor core 31 and a plurality of permanent magnets 32.

The rotor core 31 is formed in a ring shape (annular shape) disposed coaxially with the stator 20. The rotation shaft 60 is disposed in the rotor core 31. The rotation shaft 60 is fixed to the rotor core 31.

The plurality of permanent magnets 32 are fixed to the rotor core 31. In the present embodiment, a set of two permanent magnets 32 form one magnetic pole. A plurality of sets of permanent magnets 32 are disposed at equal intervals in the circumferential direction. In the present embodiment, 12 sets (24 in total) of permanent magnets 32 are provided at intervals of 30 degrees of the central angle centered on the central axis O.

In the present embodiment, an interior permanent magnet motor is used as the permanent magnetic electric motor. A plurality of through-holes 33 that penetrate the rotor core 31 in the axial direction are formed in the rotor core 31. The plurality of through-holes 33 are provided to correspond to the plurality of permanent magnets 32. The permanent magnets 32 that are disposed in the corresponding through-holes 33 are fixed to the rotor core 31. Fixing of each permanent magnet 32 to the rotor core 31 can be realized by, for example, adhering the outer surface of the permanent magnet 32 and the inner surface of the through-hole 33 with an adhesive. Here, a surface permanent magnet motor may be used as the permanent magnetic electric motor in place of the interior permanent magnet motor.

<Laminated Core>

Figure 3:
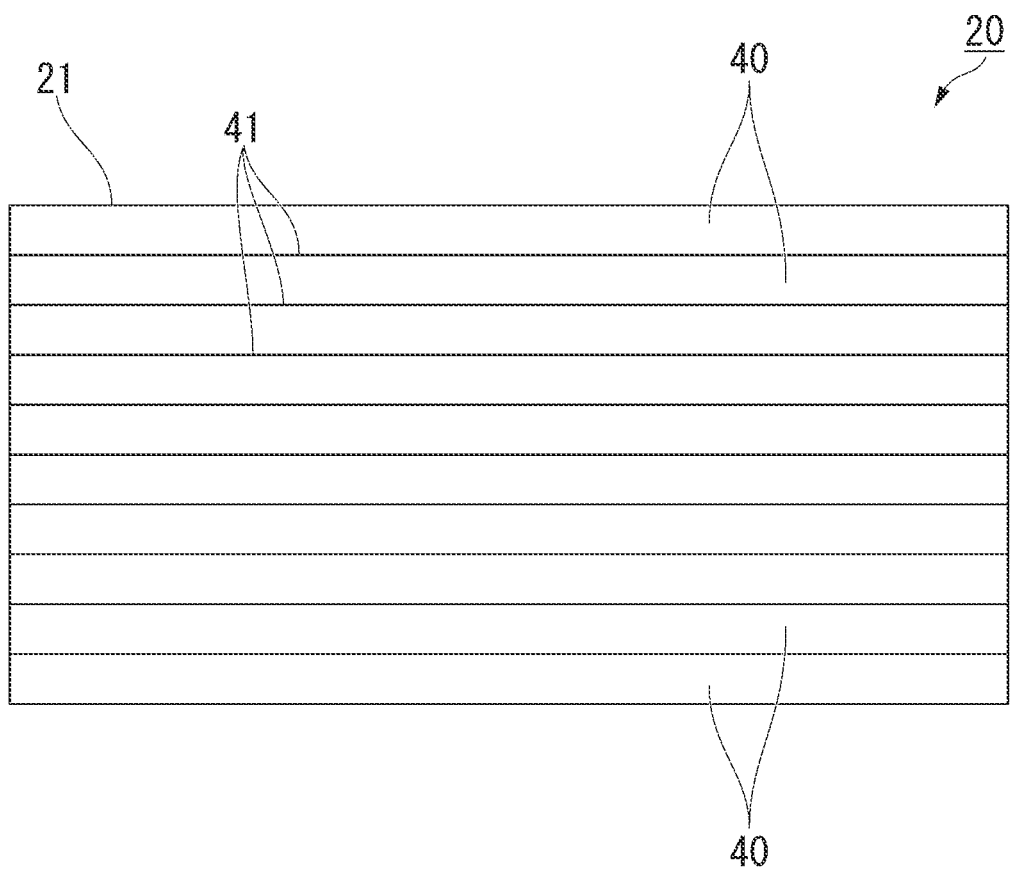
FIG. 3 is a front view of the stator included in the electric motor of the first embodiment.

As shown in FIG. 3, the stator core 21 is a laminated core. The stator core 21 is formed by stacking a plurality of electrical steel sheets 40. That is, the stator core 21 includes the plurality of electrical steel sheets 40 stacked in the thickness direction.

Here, the stacking thickness of the stator core 21 is, for example, 50.0 mm. The outer diameter of the stator core 21 is, for example, 250.0 mm. The inner diameter of the stator core 21 is, for example, 165.0 mm. However, these values are examples, and the stacking thickness, the outer diameter and the inner diameter of the stator core 21 are not limited to these values. Here, the inner diameter of the stator core 21 is based on the tip of the tooth part 23 in the stator core 21. The inner diameter of the stator core 21 is a diameter of a virtual circle inscribed in the tips of all of the tooth parts 23.

The electrical steel sheets 40 forming the stator core 21 are formed by, for example, punching a rolled sheet-shaped base. A known electrical steel sheet can be used as the electrical steel sheet 40. The chemical composition of the electrical steel sheet 40 is not particularly limited. In the present embodiment, a non-grain-oriented electrical steel sheet is used as the electrical steel sheet 40. For example, a non-grain-oriented electrical steel strip according to JIS C 2552:2014 can be used as the non-grain-oriented electrical steel sheet.

However, a grain-oriented electrical steel sheet can be used as the electrical steel sheet 40 in place of the non-grain-oriented electrical steel sheet. For example, a grain-oriented electrical steel strip according to JIS C 2553:2012 can be used as the grain-oriented electrical steel sheet.

The non-grain-oriented electrical steel strip has a maximum value of anisotropy of the iron loss that is smaller than a threshold value defined by JIS, and has no significant grain-orientation in the iron loss. However, since the non-grain-oriented electrical steel strip is a rolled sheet, it has grain-orientation of the iron loss that is equal to or less than the threshold value defined by JIS in the rolling direction. Similarly, the grain-oriented electrical steel strip has the smallest iron loss in the rolling direction. Therefore, both the non-grain-oriented electrical steel strip and the grain-oriented electrical steel strip have a smaller iron loss in the rolling direction than in other directions.

In the present embodiment, the rolling directions of the plurality of electrical steel sheets 40 forming the stator core 21 coincide with each other. As described above, the electrical steel sheet 40 has the smallest iron loss in the rolling direction. Therefore, the stator core 21 has the most excellent magnetic properties in the rolling direction of the electrical steel sheet 40.

In order to improve processability of the electrical steel sheet and the iron loss of the laminated core, an insulation coating is provided on both sides of the electrical steel sheet 40. Regarding the substance constituting the insulation coating, for example, (1) an inorganic compound, (2) an organic resin, (3) a mixture of an inorganic compound and an organic resin, or the like can be applied. Examples of inorganic compounds include (1) a complex of dichromate and boric acid and (2) a complex of phosphate and silica. Examples of organic resins include an epoxy-based resin, an acryl-based resin, an acrylic-styrene-based resin, a polyester-based resin, a silicone-based resin, and a fluorine-based resin.

In order to secure the insulation performance between the electrical steel sheets 40 stacked with each other, the thickness of the insulation coating (thickness per one side of the electrical steel sheet 40) is preferably 0.1 μm or more.

On the other hand, as the insulation coating becomes thicker, the insulation effect is saturated. In addition, as the insulation coating becomes thicker, the proportion of the insulation coating in the stator core 21 increases, and magnetic properties of the stator core 21 deteriorate. Therefore, the insulation coating is preferably thin to the extent that insulation performance can be secured. The thickness of the insulation coating (thickness per one side of the electrical steel sheet 40) is preferably 0.1 μm or more and 5 μm or less, and more preferably 0.1 μm or more and 2 μm or less.

As the electrical steel sheet 40 becomes thinner, the iron loss improving effect is gradually saturated. In addition, as the electrical steel sheet 40 becomes thinner, production cost of the electrical steel sheet 40 increases. Therefore, in consideration of the iron loss improving effect and production cost, the thickness of the electrical steel sheet 40 is preferably 0.10 mm or more.

On the other hand, when the electrical steel sheet 40 is too thick, it is difficult to perform a press punching operation on the electrical steel sheet 40. Therefore, in consideration of the press punching operation on the electrical steel sheet 40, the thickness of the electrical steel sheet 40 is preferably 0.65 mm or less.

In addition, as the electrical steel sheet 40 becomes thicker, the iron loss increases. Therefore, in consideration of iron loss characteristics of the electrical steel sheet 40, the thickness of the electrical steel sheet 40 is preferably 0.35 mm or less, and more preferably 0.20 mm or 0.25 mm.

In consideration of the above points, the thickness of each electrical steel sheet 40 is, for example, 0.10 mm or more and 0.65 mm or less, preferably 0.10 mm or more and 0.35 mm or less, and more preferably 0.20 mm or 0.25 mm. Here, the thickness of the electrical steel sheet 40 also includes the thickness of the insulation coating.

The plurality of electrical steel sheets 40 forming the stator core 21 are adhered by adhesion parts 41. The adhesion part 41 is an adhesive that is provided between the electrical steel sheets 40 adjacent to each other in the stacking direction and is cured without being divided. Regarding the adhesive, for example, a thermosetting adhesive using polymer bonding is used. Regarding the composition of the adhesive, (1) an acrylic resin, (2) an epoxy-based resin, (3) a composition including an acrylic resin and an epoxy-based resin, or the like can be applied. As such an adhesive, in addition to a thermosetting adhesive, a radical polymerization type adhesive can also be used. In consideration of productivity, it is desirable to use a room temperature curing type adhesive. The room temperature curing type adhesive is cured at 20° C. to 30° C. Regarding the room temperature curing type adhesive, an acrylic-based adhesive is preferable. Examples of typical acrylic-based adhesives include a second generation acrylic-based adhesive (SGA). Any of an anaerobic adhesive, an instant adhesive, and an elastomer-containing acrylic-based adhesive can be used as long as the effects of the present invention are not impaired. The adhesive referred to here is the uncured adhesive, and after the adhesive is cured, it becomes the adhesion part 41.

An average tensile modulus of elasticity E of the adhesion part 41 at room temperature (20° C. to 30° C.) is in a range of 1,500 MPa to 4,500 MPa. When the average tensile modulus of elasticity E of the adhesion part 41 is less than 1,500 MPa, there is a problem of the rigidity of the laminated core decreasing. Therefore, the lower limit value of the average tensile modulus of elasticity E of the adhesion part 41 is 1,500 MPa, and more preferably 1,800 MPa. On the other hand, when the average tensile modulus of elasticity E of the adhesion part 41 exceeds 4,500 MPa, there is a problem of the insulation coating formed on the surface of the electrical steel sheet 40 being peeled off. Therefore, the upper limit value of the average tensile modulus of elasticity E of the adhesion part 41 is 4,500 MPa, and more preferably 3,650 MPa.

Here, the average tensile modulus of elasticity E is measured by a resonance method. Specifically, the tensile modulus of elasticity is measured according to JIS R 1602: 1995.

More specifically, first, a measurement sample (not shown) is produced. This sample is obtained by adhering two electrical steel sheets 40 with an adhesive to be measured, and curing them to form the adhesion part 41. When the adhesive is a thermosetting type, this curing is performed by heating and pressurizing under heating and pressurizing conditions in an actual operation. On the other hand, when the adhesive is a room temperature curing type adhesive, the curing is performed by pressurizing at room temperature.

Then, the tensile modulus of elasticity of this sample is measured by a resonance method. A method of measuring the tensile modulus of elasticity using the resonance method is performed according to JIS R 1602:1995 as described above. Then, the influence of the electrical steel sheet 40 itself is calculated and removed from the tensile modulus of elasticity (measured value) of the sample to determine the tensile modulus of elasticity of the adhesion part 41 itself.

Since the tensile modulus of elasticity determined from the sample in this manner is equal to the average value of the laminated core as a whole, this numerical value is regarded as the average tensile modulus of elasticity E. The composition is set so that the average tensile modulus of elasticity E is almost the same at the stack position in the stacking direction and at the circumferential direction position around the central axis of the laminated core. Therefore, the average tensile modulus of elasticity E can be set to a numerical value obtained by performing measurement on the cured adhesion part 41 at the upper end position of the laminated core.

The motor generates heat during driving. Therefore, when the melting point of the adhesion part 41 is low, the adhesion part 41 melts due to heat generated by the motor, the shape of an adhesion region 42 changes, and a desired effect cannot be obtained. Generally, an insulating coating (enamel) is provided on the surface of the winding wound around the stator core 21. The heatproof temperature of this coating is, for example, about 180° C. Therefore, a general motor is driven so that the temperature becomes 180° C. or lower. That is, the motor can be heated up to about 180° C. In the present embodiment, the melting point of the adhesion part 41 is preferably 180° C. or higher. In addition, in consideration of the safety factor considering the fact that there is a part in which the temperature is locally high, the melting point of the adhesion part 41 is more preferably 200° C. or higher.

Regarding the adhesion method, for example, a method in which an adhesive is applied to the electrical steel sheet 40 and adhesion is then performed by either or both of heating and press-stacking can be used. Here, as the heating method, any method, for example, heating in a high temperature bath or an electric furnace, or directly applying electricity, may be used.

In order to obtain stable and sufficient adhesion strength, the thickness of the adhesion part 41 is preferably 1 µm or more.

On the other hand, when the thickness of the adhesion part 41 exceeds 100 pin, the adhesion force is maximized. In addition, as the adhesion part 41 becomes thicker, the space factor decreases, and magnetic properties such as the iron loss of the laminated core deteriorate. Therefore, the thickness of the adhesion part 41 is preferably 1 µm or more and 100 µm or less, and more preferably 1 µm or more and 10 µm or less.

Here, in the above, the thickness of the adhesion part 41 is an average thickness of the adhesion parts 41.

The average thickness of the adhesion parts 41 is more preferably 1.0 µm or more and 3.0 µm or less. When the average thickness of the adhesion parts 41 is less than 1.0 µm, a sufficient adhesion force cannot be secured as described above. Therefore, the lower limit value of the average thickness of the adhesion parts 41 is 1.0 µm, and more preferably 1.2 µm. On the other hand, when the average thickness of the adhesion parts 41 is thicker than 3.0 µm, there is a problem of the strain amount of the electrical steel sheet 40 significantly increasing due to shrinkage during thermosetting. Therefore, the upper limit value of the average thickness of the adhesion parts 41 is 3.0 µm, and more preferably 2.6 µm.

The average thickness of the adhesion parts 41 is an average value of the laminated core as a whole. The average thickness of the adhesion parts 41 is almost the same at the stack position in the stacking direction and at the circumferential direction position around the central axis of the laminated core. Therefore, the average thickness of the adhesion parts 41 can be set to an average value of numerical values measured at 10 or more points in the circumferential direction at the upper end position of the laminated core.

Here, the average thickness of the adhesion parts 41 can be adjusted, for example, by changing the amount of the adhesive applied. In addition, for example, when the adhesive is a thermosetting type, the average tensile modulus of elasticity E of the adhesion part 41 can be adjusted by changing either or both of heating and pressurizing conditions applied during adhesion and the type of curing agent.

Next, the relationship between the electrical steel sheet 40 and the adhesion part 41 will be described with reference to FIG. 4.

Here, in this specification, the direction in which the plurality of electrical steel sheets 40 are stacked is simply referred to as a stacking direction. The stacking direction coincides with the thickness direction of the electrical steel sheet 40. In addition, the stacking direction coincides with the direction in which the central axis O extends.

When viewed in the stacking direction, the plurality of adhesion parts 41 are formed as a whole in a stripe shape. The entire surfaces of the electrical steel sheets 40 adjacent to each other in the stacking direction are not completely adhered to each other. All of these electrical steel sheets 40 are locally adhered to each other.

When viewed in the stacking direction, the plurality of adhesion parts 41 are formed in a belt shape in a first direction D1, and the adhesion parts 41 are arranged at equal intervals in a second direction D2. In other words, the surface of the electrical steel sheet 40 facing the stacking direction (hereinafter referred to as a first surface of the electrical steel sheet 40) includes the adhesion region 42 in which the adhesion part 41 is provided and a non-adhesion region 43 (blank region) in which the adhesion part 41 is not provided. Here, the adhesion region 42 of the electrical steel sheet 40 in which the adhesion part 41 is provided is a region of the first surface of the electrical steel sheet 40 in which the adhesive cured without being divided is provided. In addition, the non-adhesion region 43 of the electrical steel sheet 40 in which the adhesion part 41 is not provided is a region of the first surface of the electrical steel sheet 40 in which the adhesive cured without being divided is not provided. The adhesion parts 41 are formed in a belt shape that extends in the first direction D1, and are arranged at equal intervals in the second direction D2. Therefore, the adhesion region 42 and the non-adhesion region 43 of the first surface of the electrical steel sheet 40 are formed in a belt shape that extends in the first direction D1, and the adhesion region 42 and the non-adhesion region 43 are alternately formed in the second direction D2.

Here, the first direction D1 is a direction in which the adhesion part 41 formed in a belt shape extends, and corresponds to the long side direction of the adhesion part 41. In addition, the second direction D2 corresponds to the short side direction of the adhesion part 41 formed in a belt shape. In addition, the first direction D1 and the second direction D2 are orthogonal to each other. Here, in the present embodiment, a case in which the width dimensions of the adhesion parts 41 and the gap dimensions between the adhesion parts 41 are uniform is assumed.

In addition, in this specification, the "belt shape" as a shape in which the adhesion part 41 extends is a shape that extends in one direction and means that the width is 1.5% or more of the outer diameter of the stator core 21. When the width of the adhesion part 41 is 1.5% or more of the outer diameter of the stator core 21, it is possible to secure sufficient adhesion strength between the electrical steel sheets 40.

Figure 4:
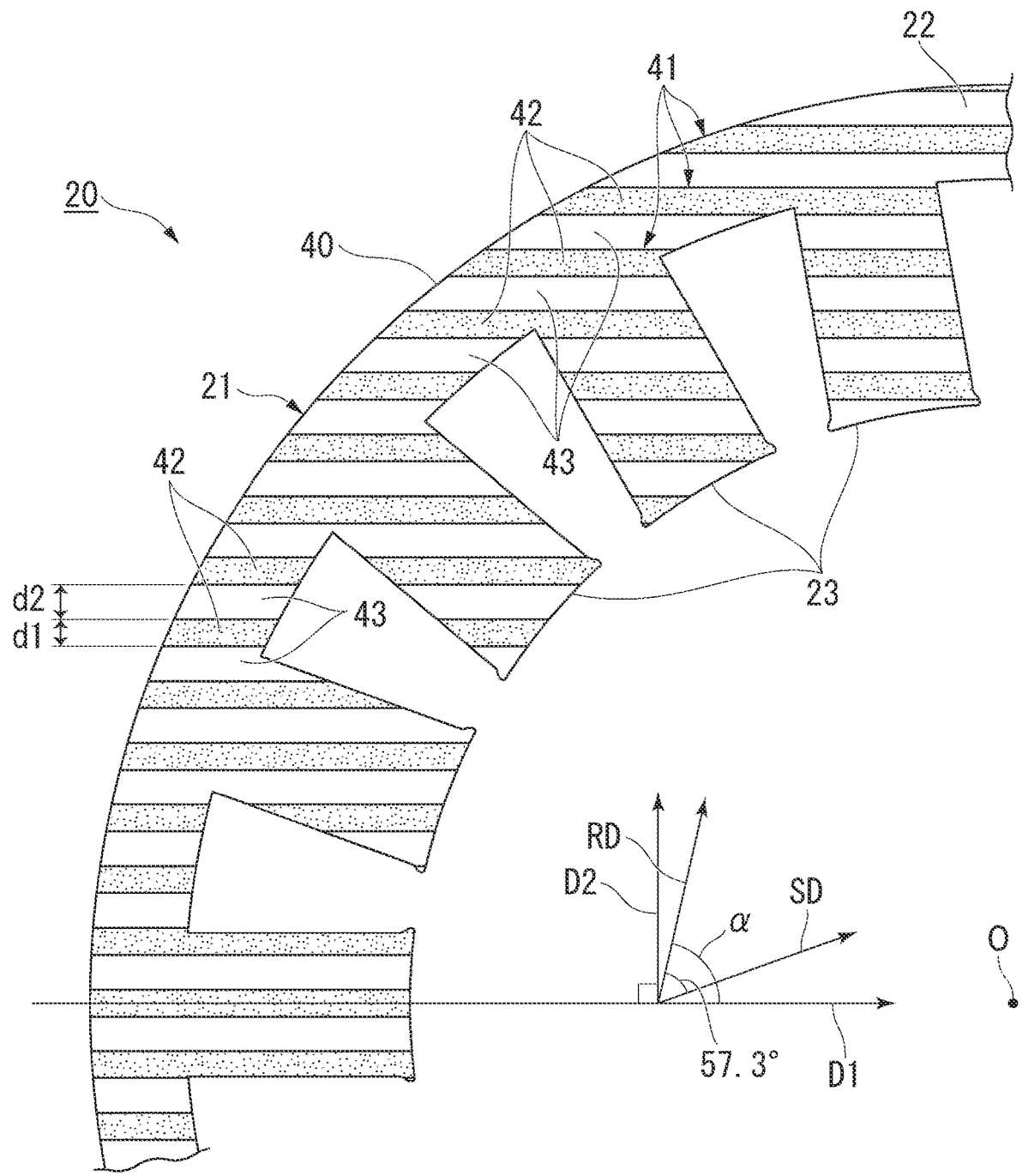
FIG. 4 is a schematic view of electrical steel sheets and adhesion parts of the first embodiment.

In FIG. 4, a rolling direction RD of the electrical steel sheet 40 is shown. In addition, an angle formed by the first direction D1 and the rolling direction RD of the electrical steel sheet 40 is set as an angle α. Generally, a larger and smaller angles are defined as an angle formed by two directions, and the angle α is the smaller angle between two angles formed by the first direction D1 and the rolling direction RD. That is, in this specification, the angle α is an angle of 0° or more and 90° or less.

In the present embodiment, the adhesive shrinks during curing. Therefore, compressive stress is applied to the electrical steel sheet 40 as the adhesive is cured, and strain occurs in the electrical steel sheet 40 accordingly. When strain occurs in the electrical steel sheet 40, the value of the iron loss may increase and magnetic properties of the stator core 21 may deteriorate.

Here in this specification, an increase in the value of the iron loss may be referred to as "deterioration of iron loss".

When the adhesion parts 41 are formed in a belt shape, the compressive stress applied to the electrical steel sheet 40 becomes the largest in the direction (the first direction D1) in which the adhesion part 41 extends.

The electrical steel sheet 40 has the highest rigidity in the direction orthogonal to the rolling direction RD and is unlikely to be strained by compressive stress. Therefore, when the angle α formed by the first direction D1 and the rolling direction RD is close to 90°, it is possible to minimize strain of the electrical steel sheet 40.

In addition, as described above, the iron loss of the electrical steel sheet 40 is the smallest in the rolling direction RD. On the other hand, when strain occurs in the rolling direction RD, the deterioration of the iron loss becomes most significant. Therefore, when the first direction D1 coincides with the rolling direction RD of the electrical steel sheet 40 (angle α=0°), magnetic properties of the stator core 21 deteriorate to the maximum. Therefore, when the angle α formed by the first direction D1 and the rolling direction RD is away from 0°, it is possible to minimize deterioration of the iron loss of the electrical steel sheet 40.

In the present embodiment, when the angle α formed by the first direction D1 and the rolling direction RD is away from 0° and close to 90°, it is possible to minimize strain of the electrical steel sheet 40 and minimize deterioration of the iron loss of the electrical steel sheet 40. In the present embodiment, the angle α is preferably 30° or more and 90° or less. When the angle α is set to 30° or more and the first direction D1 intersects the rolling direction at a certain angle or more, it is possible to minimize the influence of compressive stress of the adhesive on the iron loss of the electrical steel sheet 40, it is possible to minimize strain of the electrical steel sheet 40 and as a result, it is possible to secure sufficient magnetic properties of the stator core 21.

The electrical steel sheet 40 has the largest iron loss in a direction inclined by a specific angle with respect to the rolling direction RD. In this specification, the direction in which the iron loss is the largest is referred to as a specific direction SD. The inventors have found that the specific direction SD of the electrical steel sheet 40 is a direction inclined by 57.3° with respect to the rolling direction RD. Here, the specific direction SD in the present embodiment is the crystal orientation of the Miller index {111}<112> in the cubic crystal which has a crystal structure of the electrical steel sheet 40. Since the electrical steel sheet 40 originally has a large iron loss in the specific direction SD, even if strain occurs in the specific direction SD, deterioration of the iron loss is relatively small. Therefore, when the direction close to the specific direction SD is set as a direction in which strain occurs, it is possible to minimize deterioration of the iron loss of the electrical steel sheet 40 as a whole.

Here, a configuration in which deterioration of the iron loss of the electrical steel sheet 40 is minimized will be summarized. There are mainly the following two configurations in which deterioration of the iron loss of the electrical steel sheet 40 due to compressive stress of the adhesive is minimized.

The first configuration is a configuration in which the first direction D1 is closer to the direction orthogonal to the rolling direction RD of the electrical steel sheet 40. In this configuration, the strain itself of the electrical steel sheet 40 is prevented and deterioration of the iron loss is minimized. That is, in the first configuration, the angle α is preferably close to 90°.

The second configuration is a configuration in which the first direction D1 is closer to the specific direction SD of the electrical steel sheet 40. In this configuration, deterioration of the iron loss of the electrical steel sheet 40 with respect to strain is minimized. That is, in the second configuration, the angle α is preferably close to 57.3°.

Deterioration of the iron loss of the electrical steel sheet 40 due to compressive stress of the adhesive is minimized by the above two configurations. Therefore, when the angle α is set to be an angle between 57.3° and 90°, the effects of the above two configurations can be exhibited. Here, even if the angle α changes by about ±5°, there is no significant change in the iron loss. Therefore, the angle α formed by the first direction D1 and the rolling direction RD is preferably 52.3° or more and 90° or less. In addition, 57.3° can be said to be about 60°. That is, in the present embodiment, it can be said that the angle α formed by the first direction D1 and the rolling direction RD is preferably 60° or more and 90° or less.

As shown in FIG. 4, the plurality of adhesion parts 41 are formed in a belt shape with a width dimension d1 in the second direction D2 on the first surface of the electrical steel sheet 40. In addition, a gap with an interval dimension d2 is provided between two adhesion parts 41 adjacent to each other in the second direction D2. The interval dimension d2 is the width dimension of the non-adhesion region 43. Here, the width dimension d1 of the adhesion part 41 corresponds to the width dimension of the adhesion region 42, and the interval dimension d2 between the adhesion parts 41 corresponds to the width dimension of the non-adhesion region 43.

The width dimension d1 of the adhesion part 41 is preferably 5% or less of the outer diameter of the stator core 21. When the width dimension d1 is set to 5% or less of the outer diameter of the stator core 21, the electrical steel sheet 40 is not significantly locally strained due to compressive stress of the adhesive, and it is possible to minimize deterioration of the iron loss of the electrical steel sheets 40 as a whole.

The width dimension d1 of the adhesion part 41 is preferably smaller than the interval dimension d2 between the adhesion parts 41 adjacent to each other in the second direction D2 (d1<d2). In other words, the width dimension d1 is preferably less than 100% of the interval dimension d2. As described above, strain occurs in the electrical steel sheet 40 due to compressive stress of the adhesive, and the iron loss of the electrical steel sheet 40 increases due to the strain. According to the present embodiment, when the width dimension d1 is smaller than the interval dimension d2, it is possible to minimize strain of the electrical steel sheet 40 due to the adhesive and secure magnetic properties of the stator core 21.

The width dimension d1 of the adhesion part 41 is more preferably 67%±5% of the interval dimension d2 between the adhesion parts 41 adjacent to each other. When the width dimension d1 is too large with respect to the interval dimension d2, the strain of the electrical steel sheet 40 due to compressive stress of the adhesive may increase. On the other hand, when the width dimension d1 is too small with respect to the interval dimension d2, the adhesion strength between the electrical steel sheets 40 may be insufficient. According to the present embodiment, when the width dimension d1 is set to 67%±5% of the interval dimension d2, it is possible to secure sufficient adhesion strength between the electrical steel sheets 40, minimize strain of the electrical steel sheet 40, and secure magnetic properties of the stator core 21.

In addition, when the width dimension d1 is 67%±5% of the interval dimension d2, the angle α formed by the first direction D1 and the rolling direction RD is preferably 75°±5°. Therefore, it is possible to more effectively minimize deterioration of magnetic properties of the stator core 21.

Next, a case in which the width dimension d1 of the adhesion part 41 is larger than the interval dimension d2 between the adhesion parts 41 adjacent to each other (d1>d2) will be described. When the width dimension d1 of the adhesion part 41 is larger than the interval dimension d2, it is possible to increase an adhesion force between the electrical steel sheets 40.

On the other hand, the strain of the electrical steel sheet 40 due to compressive stress of the adhesive may increase. Therefore, when the width dimension d1 of the adhesion part 41 is larger than the interval dimension d2, the direction (the first direction D1) in which the adhesion part 41 extends is preferably closer to the direction in which the rigidity is high (the direction orthogonal to the rolling direction RD). More specifically, when the width dimension d1 of the adhesion part 41 is larger than the interval dimension d2, the angle α formed by the first direction D1 and the rolling direction RD is preferably 85° or more. Therefore, it is possible to increase an adhesion force between the electrical steel sheets 40, minimize strain of the electrical steel sheet 40, and secure magnetic properties of the stator core 21.

In the present embodiment, the rolling directions RD of all of the electrical steel sheets 40 forming the stator core 21 coincide with each other. However, the rolling directions RD of all of the electrical steel sheets 40 may not coincide with each other. For example, the stator core 21 may be formed by turn-stacking the electrical steel sheets 40. As an example, a stator core in which the electrical steel sheets 40 are turn-stacked will be described in detail. In the turn-stacked stator core, a layer of one adhesion part 41 and a set of electrical steel sheets 40 between which the layer is interposed are focused on. The rolling directions RD of the set of electrical steel sheets 40 between which the layer of the adhesion part 41 is interposed are different from each other. In this case, the angle α formed by the first direction D1 and the rolling direction RD of the electrical steel sheet 40 positioned on one side in the stacking direction should be included in the above preferable angle range, and the angle α formed by the first direction D1 and the rolling direction RD of the electrical steel sheet 40 on the other side in the stacking direction should be included in the above preferable angle range. Here, in the turn-stacked stator core, the first directions D1 of the layers of the adhesion parts 41 provided between the electrical steel sheets 40 may be different from each other.

In the present embodiment, the rotor core 31 is a laminated core like the stator core 21. That is, the rotor core 31 includes a plurality of electrical steel sheets stacked in the thickness direction. In the present embodiment, the stacking thickness of the rotor core 31 is equal to that of the stator core 21, and is, for example, 50.0 mm. The outer diameter of the rotor core 31 is, for example, 163.0 mm. The inner diameter of the rotor core 31 is, for example, 30.0 mm. However, these values are examples, and the stacking thickness, the outer diameter, and the inner diameter of the rotor core 31 are not limited to these values.

In the present embodiment, the plurality of electrical steel sheets forming the rotor core 31 are fixed to each other by a fastening C (dowel, refer to FIG. 1). However, the plurality of electrical steel sheets 40 forming the rotor core 31 may be adhered by the same adhesion parts as the stator core 21.

Second Embodiment

Next, an electric motor 110 of a second embodiment will be described with reference to FIG. 5 and FIG. 6.

Figure 5:
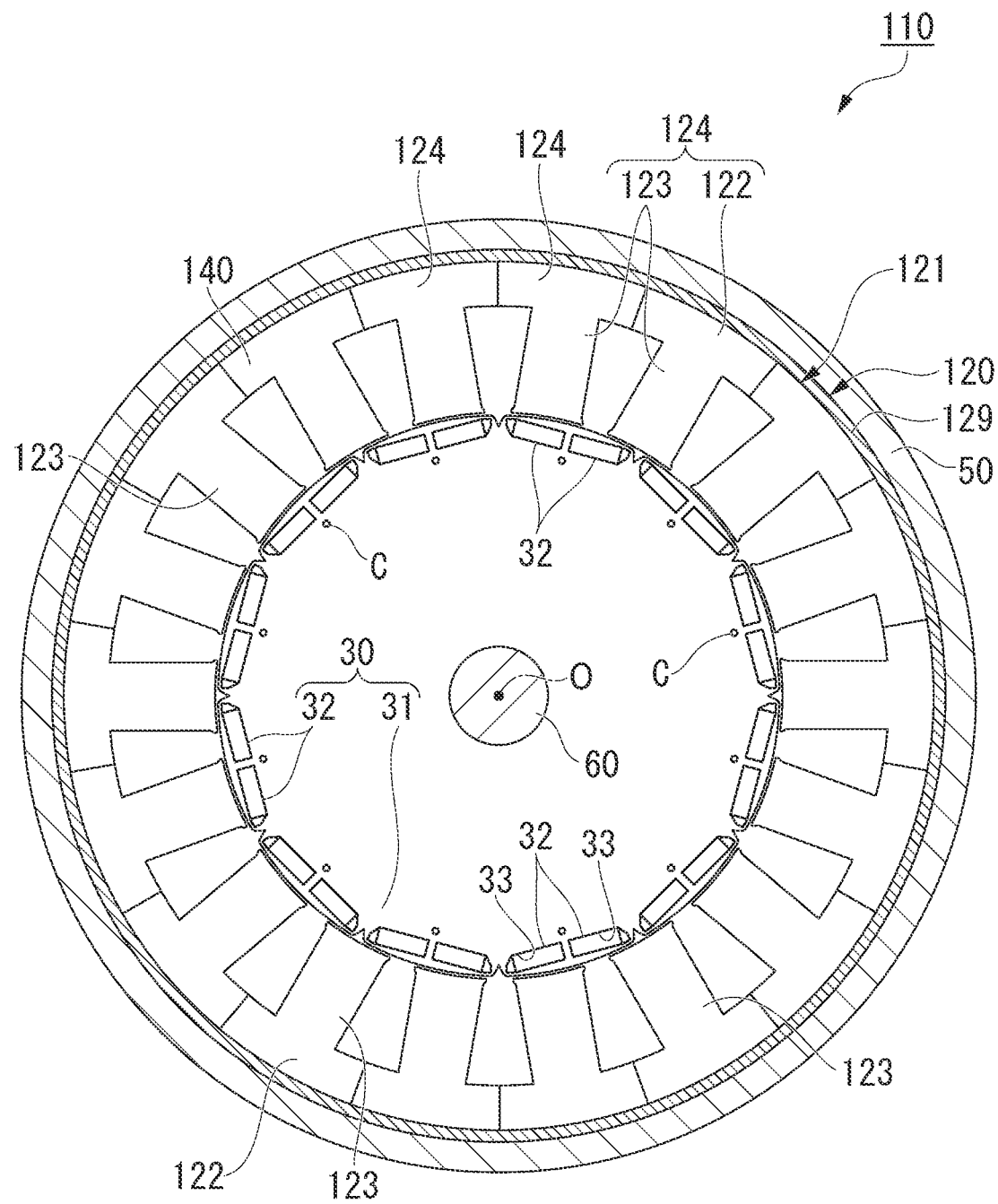
FIG. 5 is a plan view of an electric motor according to a second embodiment.

As shown in FIG. 5, the electric motor 110 of the second embodiment includes a rotor 30, a case 50, a rotation shaft 60, and a stator 120, which are the same as those of the first embodiment.

The stator 120 includes a stator core (laminated core) 121, a fastening ring 129, and a winding (not shown).

The stator core 121 is a split core. Therefore, the stator core 121 includes a plurality of core blocks (laminated core) 124. The plurality of core blocks 124 are linked in a ring shape to form the stator core 121. The fastening ring 129 is disposed outside the plurality of core blocks 124 in the radial direction. The plurality of core blocks 124 are fixed to each other by being fitted into the fastening ring 129.

Here, the stator core 121 of the present embodiment is a split core, and other configurations such as dimensions of respective parts are the same as those of the first embodiment.

Next, the core block 124 will be described.

The core block 124 is an aspect of a laminated core. The core block 124 includes an arc-shaped core back part 122 that extends in the circumferential direction and a tooth part 123.

The core back part 122 is formed in an arc shape centered on the central axis O in a plan view when the stator 120 is viewed in the axial direction.

The tooth part 123 protrudes inward in the radial direction from the core back part 122 (toward the central axis O of the core back part 122 in the radial direction). When the plurality of core blocks 124 are arranged in a ring shape in the circumferential direction to form the stator core 121, the plurality of tooth parts 123 are arranged at equal intervals in the circumferential direction. In the stator 120 of the present embodiment, 18 tooth parts 123 are provided at intervals of 20 degrees centered on the central axis O. The plurality of tooth parts 123 are formed to have the same shape and the same size.

The winding is wound around the tooth part 123. The winding may be a concentrated winding or a distributed winding.

The core block 124 is formed by stacking a plurality of electrical steel sheet pieces 140 formed by punching an electrical steel sheet in the axial direction. That is, the core block 124 includes the plurality of electrical steel sheet pieces 140 stacked to each other. Therefore, the stator core 121 is a laminated core. Each of the plurality of electrical steel sheet pieces 140 has a T-shape when viewed in the axial direction.

The electrical steel sheet pieces 140 forming the core block 124 are formed by, for example, punching a rolled sheet-shaped base. The same electrical steel sheets as in the first embodiment can be used as the electrical steel sheet pieces 140.

The plurality of electrical steel sheet pieces 140 forming the core block 124 are adhered by adhesion parts 141. Regarding the adhesive forming the adhesion part 141 of the present embodiment, the same adhesive as in the first embodiment is used.

Next, the relationship between the electrical steel sheet pieces 140 and the adhesion part 141 will be described with reference to FIG. 6. In FIG. 6, the adhesion part 141 is emphasized with a dot pattern.

When viewed in the stacking direction, the plurality of adhesion parts 141 are formed in a stripe shape as a whole. The electrical steel sheet pieces 140 adjacent to each other in the stacking direction are not completely adhered but are locally adhered and fixed to each other.

When viewed in the stacking direction, the plurality of adhesion parts 141 are formed in a belt shape in the first direction D1, and the adhesion parts 141 are arranged at equal intervals in the second direction D2. In other words, the surface of the electrical steel sheet pieces 140 facing the stacking direction (hereinafter referred to as a first surface of the electrical steel sheet pieces 140) includes an adhesion region 142 in which the adhesion part 141 is provided and a non-adhesion region 143 (blank region) in which the adhesion part 141 is not provided. Here, the adhesion region 142 of the electrical steel sheet pieces 140 in which the adhesion part 141 is provided is a region of the first surface of the electrical steel sheet pieces 140 in which the adhesive cured without being divided is provided. In addition, the non-adhesion region 143 of the electrical steel sheet pieces 140 in which the adhesion part 141 is not provided is a region of the first surface of the electrical steel sheet pieces 140 in which the adhesive cured without being divided is not provided. The adhesion parts 141 are formed in a belt shape that extends in the first direction D1, and are arranged at equal intervals in the second direction D2. Therefore, the adhesion region 142 and the non-adhesion region 143 of the first surface of the electrical steel sheet pieces 140 are formed in a belt shape that extends in the first direction D1, and the adhesion region 142 and the non-adhesion region 143 are alternately formed in the second direction D2.

In the core block 124 of the present embodiment, the rolling direction RD of the electrical steel sheet pieces 140 is substantially parallel to the direction in which the tooth part 123 extends. That is, the tooth part 123 extends in the rolling direction RD. The electrical steel sheet pieces 140 have the smallest iron loss in the rolling direction RD. Since the magnetic flux flows through the tooth part 123 in the direction in which the tooth part 123 extends, if the rolling direction RD is substantially parallel to the direction in which the tooth part 123 extends, it is possible to improve magnetic properties of the core block 124. Here, the terms "extend in" and "substantially parallel" include not only "strictly parallel" but also "extend in parallel within a range of ±5°". That is, in the present embodiment, the angle formed by the direction in which the tooth part 123 extends and the rolling direction RD is within 5°.

Figure 6:
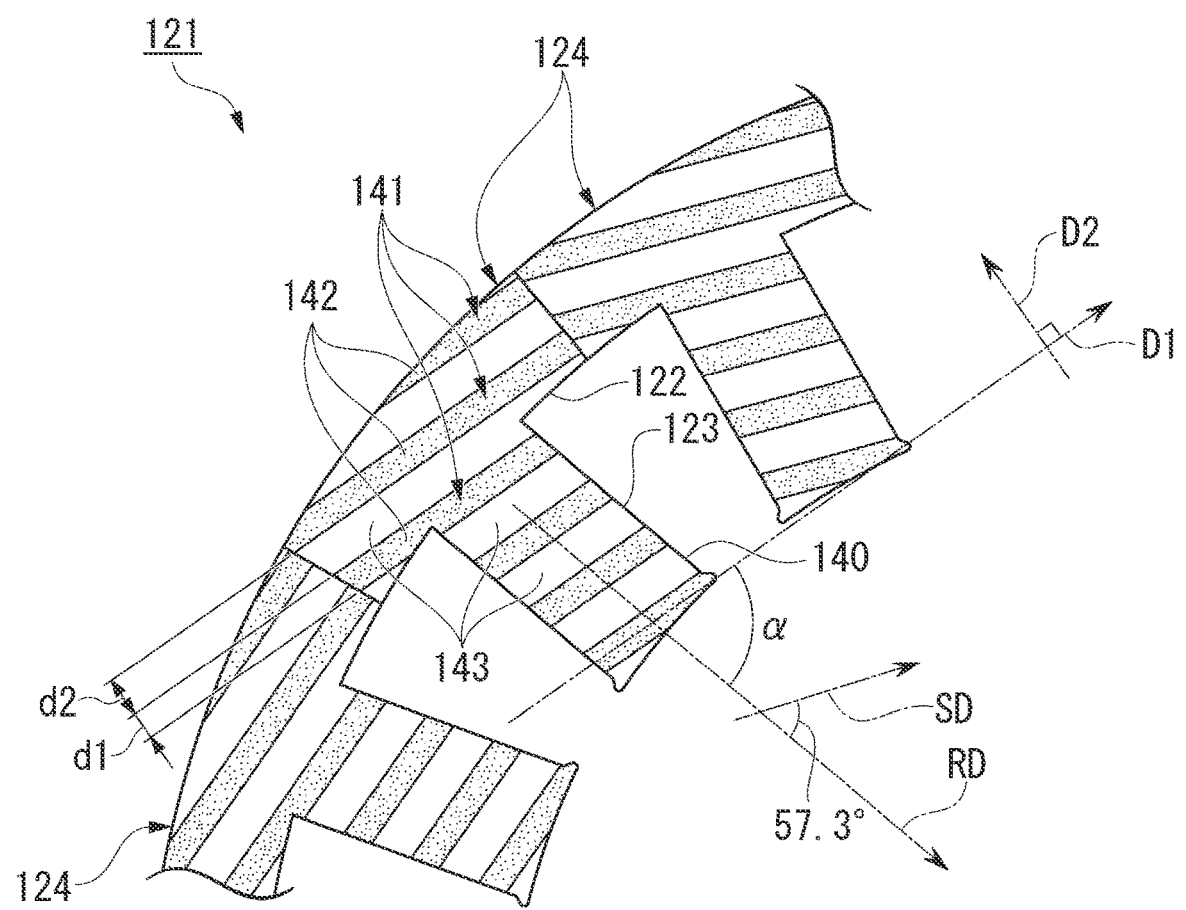
FIG. 6 is a schematic view of electrical steel sheets and adhesion parts of the second embodiment.

In FIG. 6, the angle α formed by the first direction D1 and the rolling direction RD of the electrical steel sheet pieces 140 is shown. As in the above embodiment, the electrical steel sheet pieces 140 have the highest rigidity in the direction orthogonal to the rolling direction RD and are unlikely to be strained by compressive stress. Therefore, when the angle α formed by the first direction D1 and the rolling direction RD is close to 90°, it is possible to minimize strain of the electrical steel sheet pieces 140.

In addition, as described above, the iron loss of the electrical steel sheet pieces 140 is the smallest in the rolling direction RD, but on the other hand, when strain occurs in the rolling direction RD, deterioration of the iron loss becomes most significant. Therefore, when the first direction D1 coincides with the rolling direction RD of the electrical steel sheet pieces 140 (angle α=0°), magnetic properties of the core block 124 deteriorate to the maximum. Therefore, when the angle α formed by the first direction D1 and the rolling direction RD is away from 0°, it is possible to minimize deterioration of the iron loss of the electrical steel sheet pieces 140.

In the present embodiment, when the angle α formed by the first direction D1 and the rolling direction RD is away from 0° and closer to 90°, it is possible to minimize strain of the electrical steel sheet pieces 140 and it is possible to minimize deterioration of the iron loss of the electrical steel sheet pieces 140.

In the present embodiment, the angle α is preferably 45° or more and 90° or less. When the angle α is set to 45° or more and the first direction D1 intersects the rolling direction at a certain angle or more, it is possible to minimize the influence of compressive stress of the adhesive on the iron loss of the electrical steel sheet pieces 140, it is possible to minimize strain of the electrical steel sheet pieces 140, and as a result, it is possible to secure sufficient magnetic properties of the core block 124.

Since the electrical steel sheet pieces 140 originally has a large iron loss in the specific direction SD, even if strain occurs in the specific direction SD, deterioration of the iron loss is relatively small. Therefore, when the direction close to the specific direction SD is set as a direction in which strain occurs, it is possible to minimize deterioration of the iron loss of the electrical steel sheet pieces 140 as a whole.

Here, a configuration in which deterioration of the iron loss of the electrical steel sheet pieces 140 is minimized will be summarized. There are mainly the following two configurations in which deterioration of the iron loss of the electrical steel sheet pieces 140 due to compressive stress of the adhesive is minimized.

The first configuration is a configuration in which the first direction D1 is closer to the direction orthogonal to the rolling direction RD of the electrical steel sheet pieces 140. In this configuration, the strain itself of the electrical steel sheet pieces 140 is prevented and deterioration of the iron loss is minimized. That is, in the first configuration, the angle α is preferably close to 90°.

The second configuration is a configuration in which the first direction D1 is closer to the specific direction SD of the electrical steel sheet pieces 140. In this configuration, deterioration of the iron loss of the electrical steel sheet pieces 140 with respect to strain is minimized. That is, in the second configuration, the angle α is preferably close to 57.3°.

Deterioration of the iron loss of the electrical steel sheet pieces 140 due to compressive stress of the adhesive is minimized by the above two configurations. Therefore, when the angle α is set to be an angle between 57.3° and 90°, the effects of the above two configurations can be exhibited. Here, even if the angle α changes by about ±5°, since there is no significant change in the iron loss, the angle α formed by the first direction D1 and the rolling direction RD is preferably 52.3° or more and 90° or less. In addition, since 57.3° can be said to be about 60°, it can be said in the present embodiment that the angle α formed by the first direction D1 and the rolling direction RD is preferably 60° or more and 90° or less.

The plurality of adhesion parts 141 are formed in a belt shape with the width dimension d1 in the second direction D2 on the first surface of the electrical steel sheet pieces 140. In addition, a gap with the interval dimension d2 is provided between two adhesion parts 141 adjacent to each other in the second direction D2. The interval dimension d2 is the width dimension of the non-adhesion region 143. Here, the width dimension d1 of the adhesion part 141 corresponds to the width dimension of the adhesion region 142, and the interval dimension d2 between the adhesion parts 141 corresponds to the width dimension of the non-adhesion region 143.

The width dimension d1 of the adhesion part 141 is preferably 5% or less of the outer diameter of the stator core 121. When the width dimension d1 is set to 5% or less of the outer diameter of the stator core 121, the electrical steel sheet pieces 140 is not significantly locally strained due to compressive stress of the adhesive, and it is possible to minimize deterioration of the iron loss of the electrical steel sheet pieces 140 as a whole.

The width dimension d1 of the adhesion part 141 is preferably smaller than the interval dimension d2 between the adhesion parts 141 adjacent to each other in the second direction D2 (d1<d2). In other words, the width dimension d1 is preferably less than 100% of the interval dimension d2. As described above, strain occurs in the electrical steel sheet pieces 140 due to compressive stress of the adhesive, and the iron loss of the electrical steel sheet pieces 140 increases due to the strain. According to the present embodiment, when the width dimension d1 is smaller than the interval dimension d2, it is possible to minimize strain of the electrical steel sheet pieces 140 due to the adhesive and secure magnetic properties of the core block 124.

The width dimension d1 of the adhesion part 141 is more preferably 60% or less of the interval dimension d2 between the adhesion parts 141 adjacent to each other. Therefore, it is possible to more reliably minimize strain of the electrical steel sheet pieces 140 due to the adhesive and secure magnetic properties of the core block 124. In addition, for the same reason, the width dimension d1 of the adhesion part 141 is still more preferably 43% or less of the interval dimension d2 between the adhesion parts 141 adjacent to each other.

Next, a case in which the width dimension d1 of the adhesion part 141 is larger than the interval dimension d2 between the adhesion parts 141 adjacent to each other (d1>d2) will be described. When the width dimension d1 of the adhesion part 141 is larger than the interval dimension d2, it is possible to increase an adhesion force between the electrical steel sheet pieces 140.

On the other hand, the strain of the electrical steel sheet pieces 140 due to compressive stress of the adhesive may increase. Therefore, when the width dimension d1 of the adhesion part 141 is larger than the interval dimension d2, the direction in which the adhesion part 141 extends (the first direction D1) is preferably closer to the direction in which the rigidity is high (direction orthogonal to the rolling direction RD). More specifically, when the width dimension d1 of the adhesion part 141 is larger than the interval dimension d2, the angle α formed by the first direction D1 and the rolling direction RD is preferably 85° or more. Therefore, it is possible to increase the adhesion force between the electrical steel sheet pieces 140, it is possible to minimize strain of the electrical steel sheet pieces 140, and it is possible to secure magnetic properties of the core block 124.

Next, a method of producing the core block 124 and the stator core 121 of the present embodiment will be described. The method of producing the core block 124 mainly includes a first process and a second process.

First, in the first process, a plurality of T-shaped electrical steel sheet pieces 140 are punched out from a rolled electrical steel sheet. In the first process, the electrical steel sheet pieces 140 are punched out so that the tooth parts extend in the rolling direction RD of the electrical steel sheet.

Next, in the second process, the plurality of electrical steel sheet pieces 140 are stacked with the adhesion parts 141 provided therebetween. In the second process, the plurality of adhesion parts 141 are formed in a belt shape that extends in the first direction D1 when viewed in the stacking direction. In addition, the plurality of adhesion parts 141 are arranged in the second direction D2. In addition, the plurality of electrical steel sheet pieces 140 are stacked so that the angle formed by the first direction D1 and the rolling direction RD becomes 45° or more and 90° or less. When the adhesion part 141 is cured, the plurality of electrical steel sheet pieces 140 are fixed to each other.

Modified Example

Figure 7:
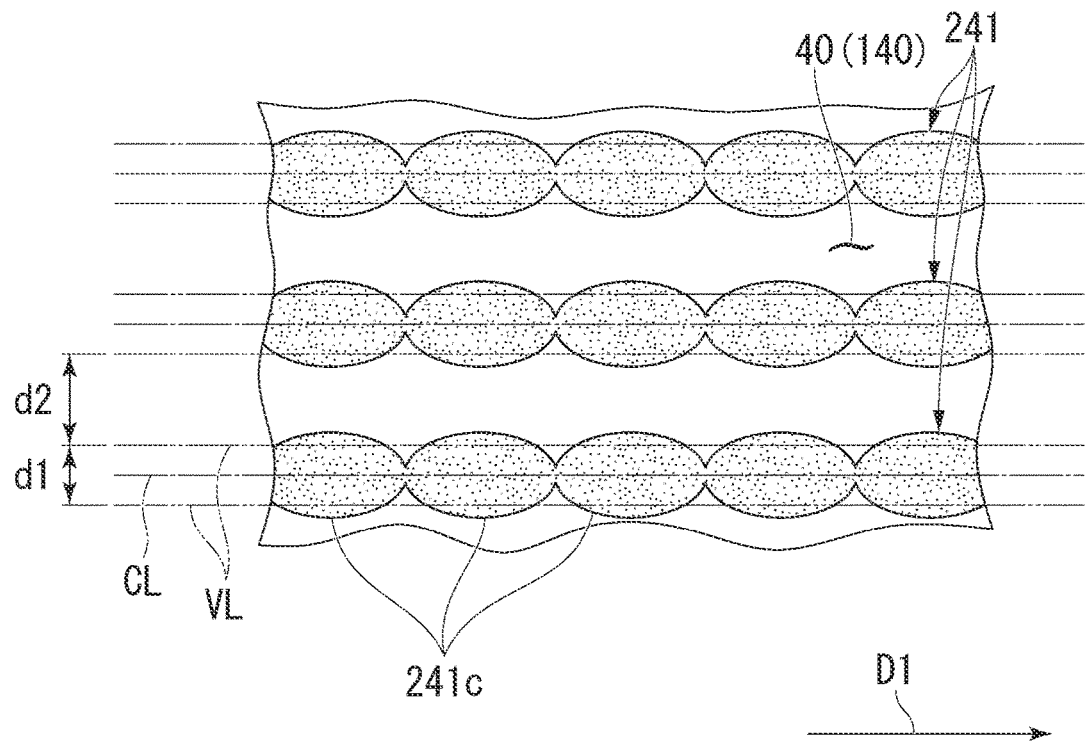
FIG. 7 is a schematic view of adhesion parts of a stator of a modified example.

Next, adhesion parts 241 of a modified example that can be applied to the above embodiments will be described with reference to FIG. 7. Here, the same components as in the above embodiments will be denoted with the same reference numerals, and descriptions thereof will be omitted.

As in the above embodiment, the plurality of adhesion parts 241 are provided between the electrical steel sheets 40 (or the electrical steel sheet pieces 140) of this modified example. The adhesion parts 241 are formed in a belt shape in the first direction D1 on the first surface of the electrical steel sheet 40 when viewed in the stacking direction. In addition, the plurality of adhesion parts 241 are arranged at equal intervals in the second direction D2. Two adhesion parts adjacent to each other in the second direction D2 are arranged to be separated by the interval dimension d2.

The adhesion parts 241 of this modified example include a plurality of element adhesion parts 241c arranged in the first direction D1. In the present embodiment, the element adhesion parts 241c are a mass of a plurality of adhesives that are arranged in the first direction D1 and form the adhesion parts 241. A plurality of adhesives have substantially the same shape. The element adhesion parts 241c adjacent to each other in the first direction D1 are linked to each other. The element adhesion parts 241c have a substantially oval shape with the first direction D1 as a major axis when viewed in the stacking direction. Therefore, both ends of the adhesion parts 241 in the width direction are wound and extend in the first direction D1. The element adhesion parts 241c may have a substantially circular shape in addition to the substantially oval shape shown in this modified example.

As shown in this modified example, "an adhesion part that extends in a belt shape" in this specification does not necessarily have to be linear at both ends in the width direction and may be wound in the first direction D1.

The adhesion parts 241 extend along a center line CL centered on the center line CL parallel to the first direction D1. The adhesion parts 241 have a symmetrical shape centered on the center line CL.

As shown in this modified example, when both ends of the adhesion parts 241 in the width direction are wound and extend, the width dimension d1 of the adhesion parts 241 can be defined as follows. That is, a virtual line VL that linearly approximates both ends of the adhesion parts 241 in the width direction is set, and the width dimension d1 of the adhesion parts 241 is defined. The virtual line VL extends substantially parallel to the center line CL. A pair of virtual lines VL are virtual linear lines that are defined so that an area of the region interposed between the pair of virtual lines VL is equal to an area of the adhesion parts 241 when viewed in the stacking direction.

In this modified example, the width dimension d1 of the adhesion parts 241 is a distance dimension between the pair of virtual lines VL in the second direction D2. In addition, in this modified example, the interval dimension d2 is a distance dimension between the virtual lines VL of the adhesion parts 241 adjacent to each other.

The adhesion part 241 shown in this modified example can have the same effects as the adhesion part 41 in the above embodiment. The adhesion part 241 of this type is formed by, for example, applying an adhesive to a plurality of points on the electrical steel sheet 40 in dot forms from a plurality of dispensers in the first direction D1 and then pressing the electrical steel sheet 40 against the other electrical steel sheet 40, and compressing the adhesive between the two electrical steel sheets 40. In this manner, even if the width dimension of the adhesion parts 241 is non-uniform, the same effects as in the above embodiment can be obtained.

Here, the technical scope of the present invention is not limited to the above embodiments and modified examples thereof, and various modifications can be made without departing from the gist of the present invention.

In the above embodiments, a case in which the adhesion parts are provided in the entire region in the plane of the electrical steel sheet 40 or the electrical steel sheet piece 140 has been described. However, the adhesion parts may be partially provided in the plane of the electrical steel sheet 40 or the electrical steel sheet piece 140. As an example, stripe-shaped adhesion parts may be provided only in a region overlapping the core back part of the electrical steel sheet. In addition, stripe-shaped adhesion parts may be provided only in a region overlapping the tooth part of the electrical steel sheet.

The shape of the stator core is not limited to the form shown in the above embodiments. Specifically, the dimensions of the outer diameter and the inner diameter of the stator core, the stacking thickness, the number of slots, the dimension ratio of the circumferential direction and the radial direction of the tooth part, the dimension ratio of the tooth part and the core back part in the radial direction, and the like can be arbitrarily designed according to desired characteristics of the electric motor.

In addition, in the core block 124 of the second embodiment, a convex shape may be provided on one end side of the core back part 122 in the circumferential direction and a concave shape may be provided on the other end side thereof in the circumferential direction. In this case, when the convex shape is inserted into the concave shape, it is possible to minimize positional deviation when the plurality of core blocks 124 are linked in the circumferential direction. In addition, the core block may have two or more tooth parts for one core back part. In addition, the core back part and the tooth part each may be a separate core block.

In the rotor in the above embodiments, a set of two permanent magnets 32 form one magnetic pole, but the present invention is not limited thereto. For example, one permanent magnet 32 may form one magnetic pole, and three or more permanent magnets 32 may form one magnetic pole.

In the above embodiments, the permanent magnetic electric motor has been exemplified as the electric motor, but the structure of the electric motor is not limited thereto, as will be exemplified below, and additionally, various known structures not exemplified below can also be used.

In the above embodiments, the permanent magnetic electric motor has been exemplified as the synchronous motor, but the present invention is not limited thereto. For example, the electric motor may be a reluctance motor or an electromagnet field motor (wound-field motor).

In the above embodiments, the synchronous motor has been exemplified as the AC motor, but the present invention is not limited thereto. For example, the electric motor may be an induction motor.

In the above embodiments, the AC motor has been exemplified as the motor, but the present invention is not limited thereto. For example, the electric motor may be a DC motor.

In the above embodiments, the motor has been exemplified as the electric motor, but the present invention is not limited thereto. For example, the electric motor may be a generator.

In the above embodiments, a case in which the laminated core according to the present invention is applied to the stator core has been exemplified, but the laminated core can be applied to the rotor core. In addition, the laminated core according to the present invention may be applied to a laminated core other than the electric motor such as a transformer.

In addition, the components in the above embodiments can be appropriately replaced with well-known components without departing from the gist of the present invention, and the above modified examples may be appropriately combined.

EXAMPLES

Next, verification tests were performed to verify the above operations and effects. The verification test was performed by a simulation using software. As software, electromagnetic field simulation software based on finite element method JMAG (commercially available from JSOL Corporation) was used.

<First Verification Test>

First, as a first verification test, the integrated core exemplified in the first embodiment was verified. As models used for simulation, stator cores (laminated cores) of Model No. A1 to Model No. A22 to be described below were assumed. The electrical steel sheet used for each model was a non-grain-oriented electrical steel sheet with a plate thickness of 0.25 mm. The shape of the electrical steel sheet was the same as that shown in FIG. 2.

In the stator cores of Model No. A1 to Model No. A21, a plurality of adhesion parts shown in FIG. 4 were provided between the electrical steel sheets. That is, in the stator cores of Model No. A1 to Model No. A21, the plurality of adhesion parts extended in a belt shape in the first direction D1. On the other hand, in the stator core of Model No. A22, between the electrical steel sheets, the adhesion parts were provided on the entire first surface of the electrical steel sheet. That is, the adhesion parts of Model No. A22 were provided on the entire first surface of the electrical steel sheet. The stator core of Model No. A22 was a model prepared in order to determine the reference value of the iron loss. Hereinafter, the stator core of Model No. A22 will be referred to as a "reference model".

The stator cores of Model No. A1 to No. A7 were models of Group A1. In the models of Group A1, the width dimension d1 of the adhesion part was 233% with respect to the interval dimension d2 between the adhesion parts adjacent to each other. In the models of Group A1, the width dimension d1 of the adhesion part was 7 mm, and the interval dimension d2 between the adhesion parts was 3 mm.

The stator cores of Model No. A8 to No. A14 were models of Group A2. In the models of Group A2, the width dimension d1 of the adhesion part was 167% with respect to the interval dimension d2 between the adhesion parts adjacent to each other. In the models of Group A2, the width dimension d1 of the adhesion part was 5 mm, and the interval dimension d2 between the adhesion parts was 3 mm.

The stator cores of Model No. A15 to No. A21 were models of Group A3. In the models of Group A3, the width dimension d1 of the adhesion part was 67% with respect to the interval dimension d2 between the adhesion parts adjacent to each other. In the models of Group A3, the width dimension d1 of the adhesion part was 2 mm, and the interval dimension d2 between the adhesion parts was 3 mm.

In Group A1, Group A2 and Group A3, models in which the angle α formed by the first direction D1 and the rolling direction RD (refer to FIG. 4) was set to 0°, 15°, 30°, 45°, 60°, 75° and 90° were prepared.

Table 1 shows the simulation results of the iron loss of the electrical steel sheet for each model. Here, the iron loss of each model is expressed as a percentage based on the value of the iron loss of the reference model (stator core of Model No. A22). In addition, Table 1 shows the results of a drop test on a mockup in which the same adhesion parts as in each model were provided. In the drop test, each model was dropped 10 times from a height of 1 m. The evaluation A indicates that the adhesion parts did not peel off after being dropped 10 times. In addition, the evaluation A-indicates that the adhesion parts did not peel off after being dropped 5 times, but did peel off by the 10$^{th}$ time.

TABLE 1

| | Model No. | Width dimension d1/interval dimension d2 | Angle α [°] | Iron loss ratio [%] | Drop test | Remark |
|---|---|---|---|---|---|---|
| Group A1 | A1 | 233% | 0° | 96.661 | A | |
| | A2 | 233% | 15° | 96.695 | A | |
| | A3 | 233% | 30° | 96.593 | A | |
| | A4 | 233% | 45° | 96.525 | A | |
| | A5 | 233% | 60° | 96.457 | A | |
| | A6 | 233% | 75° | 96.354 | A | |
| | A7 | 233% | 90° | 96.252 | A | |
| Group A2 | A8 | 167% | 0° | 95.843 | A | |
| | A9 | 167% | 15° | 95.741 | A | |
| | A10 | 167% | 30° | 95.639 | A | |
| | A11 | 167% | 45° | 95.537 | A | |
| | A12 | 167% | 60° | 95.434 | A | |
| | A13 | 167% | 75° | 95.366 | A | |
| | A14 | 167% | 90° | 95.332 | A | |
| Group A3 | A15 | 67% | 0° | 92.572 | A- | |
| | A16 | 67% | 15° | 92.504 | A- | |
| | A17 | 67% | 30° | 92.334 | A- | |
| | A18 | 67% | 45° | 92.266 | A- | |
| | A19 | 67% | 60° | 92.164 | A- | |
| | A20 | 67% | 75° | 92.095 | A- | |
| | A21 | 67% | 90° | 92.129 | A- | |
| | A22 | — | — | 100 | — | Reference model |

Comparing the stator cores of Model No. A1 to Model No. A21, it was confirmed that, in the model belonging to any of Group 1 to Group A3, when the angle α formed by the first direction D1 and the rolling direction RD was 30° or more, it was possible to minimize the iron loss. In addition, it was confirmed that, when the angle α was 60° or more, it was possible to further minimize the iron loss.

Comparing Group A1, Group A2 and Group A3 with each other, the iron loss of the model of Group A3 was the smallest. In the model of Group A3, the width dimension d1 was 67% with respect to the interval dimension d2. That is, in the model of Group A3, the width dimension d1 was smaller than the interval dimension d2. Therefore, it was thought that strain of the electrical steel sheet 40 due to the adhesive was minimized and it was possible to secure magnetic properties of the stator core 21. In addition, it was confirmed that, when the width dimension d1 was 67% with respect to the interval dimension d2, it was possible to minimize deterioration of the iron loss of the electrical steel sheet 40. Even if the ratio of the width dimension d1 to the interval dimension d2 changed by about ±5%, there was no significant change in the iron loss. Therefore, it can be said that, even if the width dimension d1 was 67%±5% with respect to the interval dimension d2, it was possible to minimize deterioration of the iron loss of the electrical steel sheet 40.

Comparing respective models in Group A3, the stator core of Model No. A20 in which the angle α formed by the first direction D1 and the rolling direction RD was 75° had the smallest iron loss. That is, it was confirmed that, when the width dimension d1 was 67% with respect to the interval dimension d2, if the angle α was set to 75°, it was possible to significantly minimize deterioration of the iron loss. Here, even if the angle α changed by about ±5°, there was no significant change in the iron loss. In addition, even if the ratio of the width dimension d1 to the interval dimension d2 changed by about ±5%, there was no significant change in the iron loss. Therefore, it can be said that, when the width dimension d1 was 67%±5% with respect to the interval dimension d2, if the angle α was set to 75°±5°, it was possible to significantly minimize deterioration of the iron loss.

In the model of Group A2, the width dimension d1 was 167% with respect to the interval dimension d2. Comparing respective models in Group A2, the stator core of Model No. A14 in which the angle α formed by the first direction D1 and the rolling direction RD was 90° had the smallest iron loss. That is, it was confirmed that, when the width dimension d1 was 167% with respect to the interval dimension d2, if the angle α was set to 90°, it was possible to significantly minimize deterioration of the iron loss. As described above, even if the angle α changed by about ±5°, there was no significant change in the iron loss. In addition, even if the ratio of the width dimension d1 to the interval dimension d2 changed by about ±5%, there was no significant change in the iron loss. Therefore, it can be said that, when the width dimension d1 was 167%±5% with respect to the interval dimension d2, if the angle α was set to 85° or more, it was possible to significantly minimize deterioration of the iron loss.

In the model of Group A1, the width dimension d1 was 233% with respect to the interval dimension d2. Comparing respective models in Group A1, the stator core of Model No. A7 in which the angle α formed by the first direction D1 and the rolling direction RD was 90° had the smallest iron loss. That is, it was confirmed that, when the width dimension d1 was 233% with respect to the interval dimension d2, if the angle α was set to 90°, it was possible to significantly minimize deterioration of the iron loss. As described above, even if the angle α changed by about ±5°, there was no significant change in the iron loss. In addition, even if the ratio of the width dimension d1 to the interval dimension d2 changed by about ±5%, there was no significant change in the iron loss. Therefore, it can be said that, when the width dimension d1 was 233%±5% with respect to the interval dimension d2, if the angle α was set to 85° or more, it was possible to significantly minimize deterioration of the iron loss.

As shown in Table 1, the mockups of Group A1 and Group A2 had better drop strength than the mockup of Group A3. In the mockups of Group A1 and Group A2, the width dimension d1 of the adhesion part was larger than the interval dimension d2, and in the mockup of Group A3, the width dimension d1 of the adhesion part was smaller than the interval dimension d2. Accordingly, it was confirmed that, when the width dimension d1 of the adhesion part was larger than the interval dimension d2 between the adhesion parts adjacent to each other in the second direction D2, it was possible to increase the adhesion strength.

Next, in addition to the above models of Nos. A1 to A21, a simulation was performed on models in which the width dimension d1/the interval dimension d2 and the angle α were changed in a wide range. More specifically, simulation models in which the width dimension d1/the interval dimension d2 was changed to 0%, 50%, 67%, 100%, 150%, 167%, 200%, 233%, 250%, 300%, 350%, 400%, 450%, and 500%, and the angle α was changed to 0°, 15°, 30°, 45°, 60°, 75°, and 90° were prepared, and the iron loss was calculated. In addition, based on these simulation results, a threshold value at which the iron loss was improved was verified for the reference Model No. A22 of the related art.

Figure 8:
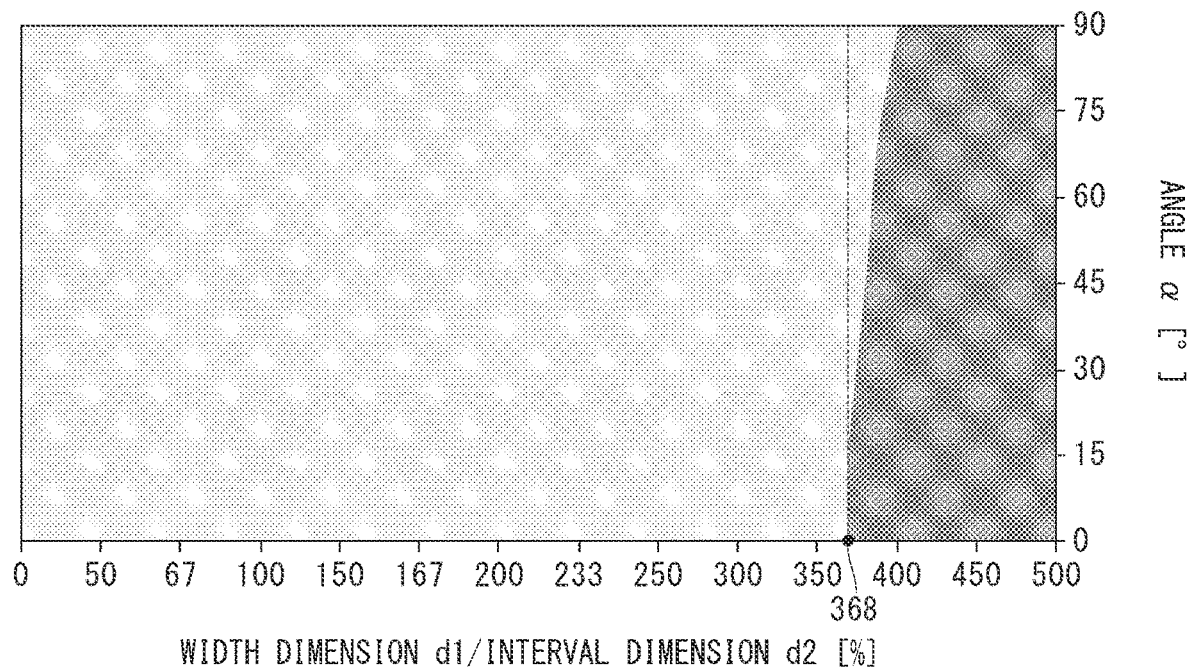
FIG. 8 is a graph showing a ratio of a width dimension to an interval dimension of adhesion parts and an iron loss with respect to an angle in a first verification test.

FIG. 8 is a graph in which the horizontal axis represents the width dimension d1/the interval dimension d2 and the vertical axis represents the angle α, and the iron loss ratio with respect to the reference Model No. 22 is indicated by the grayscale shade. In FIG. 8, the region in which the grayscale density is low indicates that the iron loss is improved (that is, the iron loss ratio is 100% or less) compared to the reference Model No. A22.

As shown in FIG. 8, when the width dimension d1/the interval dimension d2 was 368% or less, the iron loss was improved compared to the reference Model No. A22 of the related art regardless of the angle α. That is, it was confirmed that the width dimension d1 of the adhesion part was preferably 368% or less with respect to the interval dimension d2 between the adhesion parts adjacent to each other in the second direction D2. When the width dimension d1/the interval dimension d2 was smaller, the iron loss was improved, and the width dimension d1/the interval dimension d2 was preferably 233% or less, more preferably 167% or less, and still more preferably 67% or less.

<Second Verification Test>

Next, in a second verification test, the split core exemplified in the second embodiment was verified.

As models used for simulation, stator cores (laminated cores) of Model No. B1 to Model No. B21 to be described below were assumed. The stator cores of Model No. B1 to Model No. B21 had a plurality of core blocks linked in the circumferential direction. The core block of each stator core was formed of a non-grain-oriented electrical steel sheet piece with a plate thickness of 0.25 mm. The shape of the electrical steel sheet piece was the same as that shown in FIG. 6, and the rolling direction RD of the electrical steel sheet piece coincided with the direction in which the tooth part extended.

In the core blocks of Model No. B1 to Model No. B21, a plurality of adhesion parts as shown in FIG. 6 were provided between the electrical steel sheet pieces. That is, in the core blocks of Model No. B1 to Model No. B21, the plurality of adhesion parts extended in a belt shape in the first direction D1.

The stator cores of Model No. B1 to No. B7 were models of Group B1. In the models of Group B1, the width dimension d1 of the adhesion part was 150% with respect to the interval dimension d2 between the adhesion parts adjacent to each other. The width dimension d1 of the adhesion part of the models of Group B1 was 3 mm, and the interval dimension d2 between the adhesion parts was 2 mm. The stator cores in Group B1 in which the angle α formed by the first direction D1 and the rolling direction RD (refer to FIG. 6) was set to 0°, 15°, 30°, 45°, 60°, 75° and 90° were used as Model No. B1 to No. B7.

The stator cores of Model No. B8 to No. B14 were models of Group B2. In the models of Group B2, the width dimension d1 of the adhesion part was 60% with respect to the interval dimension d2 between the adhesion parts adjacent to each other. In the models of Group B2, the width dimension d1 of the adhesion part was 3 mm, and the interval dimension d2 between the adhesion parts was 5 mm. The stator cores in Group B2 in which the angle α formed by the first direction D1 and the rolling direction RD (refer to FIG. 6) was set to 0°, 15°, 30°, 45°, 60°, 75° and 90° were used as Model No. B8 to No. B14.

The stator cores of Model No. B15 to No. B21 were models of Group B3. In the models of Group B3, the width dimension d1 of the adhesion part was 43% with respect to the interval dimension d2 between the adhesion parts adjacent to each other. In the models of Group B3, the width dimension d1 of the adhesion part was 3 mm, and the interval dimension d2 between the adhesion parts was 7 mm. The stator cores in Group B3 in which the angle α formed by the first direction D1 and the rolling direction RD (refer to FIG. 6) was set to 0°, 15°, 30°, 45°, 60°, 75° and 90° were used as Model No. B15 to No. B21.

Figure 9:
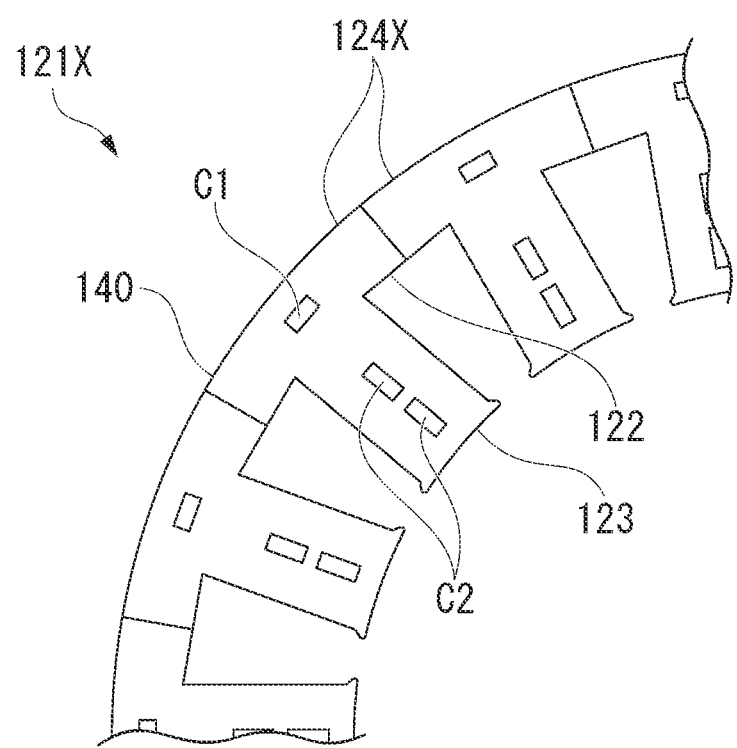
FIG. 9 is a plan view of a stator core of a reference model as a simulation target for iron loss in a second verification test and is a plan view showing a state in which electrical steel sheets are fastened and bonded.

In addition, as a comparison target, as shown in FIG. 9, the iron loss of a stator core 121X of Model No. B22 in which a plurality of non-grain-oriented electrical steel sheet pieces 140 were fastened in all layers was determined. The stator core 121X of Model No. B22 was a model prepared for comparing the iron loss between the conventional configuration and the present invention. Hereinafter, the stator core of Model No. B22 will be called a "reference model". The stator core 121X of the reference model had the plurality of core blocks 124X. In the stator core 121X of the reference model, the plate thickness of the electrical steel sheet pieces 140 was 0.25 mm, and the rolling direction RD of the electrical steel sheet piece coincided with the direction in which the tooth part extended. In the core block of the stator core 121X of the reference model, a first fastening C1 provided in the core back part 122 and two second fastenings C2 provided in the tooth part 123 were provided. The first fastening C1 was positioned at the center of the core back part 122 in the circumferential direction. The two second fastenings C2 were arranged in the radial direction at the center of the tooth part 123 in the circumferential direction. The ratio of the area of the fastenings C1 and C2 within the first surface of the electrical steel sheet pieces 140 was about 3.2%.

Table 2 shows the simulation results of the iron loss of the electrical steel sheet piece for each model. In addition, Table 2 shows the results obtained by performing the drop test on mockups in which the same adhesion parts as those of each model were provided. The drop test was performed in the same procedure as in the above first verification test. In addition, evaluation criteria for the drop test in this test were the same as in the first verification test.

Here, the iron loss inhibition rate Rt shown in Table 2 was a value obtained by dividing a difference between the iron loss of each model and the iron loss of the reference model (the stator core of Model No. B22) by the iron loss of the reference model and expressed as a percentage. That is, the iron loss inhibition rate in the table was expressed by the following Formula (1) when the iron loss of each model was set as W and the iron loss of the reference model was set as Worg.

[Math. 1]

$$Rt = \frac{W - W_{org}}{W_{org}} \times 100 \, [\%] \quad (1)$$

TABLE 2

| Model No. | Width dimension d1/interval dimension d2 | Angle α [°] | Iron loss inhibition rate Rt [%] | Drop test | Remark |
|---|---|---|---|---|---|
| Group B1 | B1 | 150% | 0° | −6.9 | A |
| | B2 | 150% | 15° | −7.2 | A |
| | B3 | 150% | 30° | −7.5 | A |
| | B4 | 150% | 45° | −7.9 | A |
| | B5 | 150% | 60° | −8.0 | A |
| | B6 | 150% | 75° | −7.8 | A |
| | B7 | 150% | 90° | −8.3 | A |
| Group B2 | B8 | 60% | 0° | −7.5 | A− |
| | B9 | 60% | 15° | −7.8 | A− |
| | B10 | 60% | 30° | −7.8 | A− |
| | B11 | 60% | 45° | −7.9 | A− |
| | B12 | 60% | 60° | −8.1 | A− |
| | B13 | 60% | 75° | −8.3 | A− |
| | B14 | 60% | 90° | −8.5 | A− |
| Group B3 | B15 | 43% | 0° | −7.5 | A− |
| | B16 | 43% | 15° | −7.7 | A− |
| | B17 | 43% | 30° | −8.0 | A− |
| | B18 | 43% | 45° | −8.2 | A− |
| | B19 | 43% | 60° | −8.2 | A− |
| | B20 | 43% | 75° | −8.6 | A− |
| | B21 | 43% | 90° | −8.9 | A− |
| | B22 | — | — | 0 | — | Reference model |

Comparing the stator cores of Model No. B1 to Model No. B21, it was confirmed that, in the model belonging to any of Group 1 to Group B3, when the angle α formed by the first direction D1 and the rolling direction RD was 45° or more, it was possible to sufficiently minimize the iron loss (the iron loss inhibition rate Rt was −7.8% or less). In addition, it was confirmed that, when the angle α was 60° or more, it was possible to further minimize the iron loss (the iron loss inhibition rate Rt was −7.9% or less).

Comparing Group B1, Group B2 and Group B3 with each other, the iron loss of the model of Group B2 was smaller than the iron loss of the model of Group B1, and additionally, the iron loss of the model of Group B3 was the smallest. In the models of Group B2 and Group B3, the width dimension d1 was smaller than the interval dimension d2. Therefore, it was thought that strain of the electrical steel sheet pieces 140 due to the adhesive was minimized and it was possible to secure magnetic properties of the stator core 121. In the model of Group B2, the width dimension d1 was 60% with respect to the interval dimension d2, and in the model of Group B3, the width dimension d1 was 43% with respect to the interval dimension d2. That is, in the model of Group B3, the ratio of the width dimension d1 to the interval dimension d2 was smaller than that of the model of Group B2. It was confirmed that it was possible to minimize deterioration of the iron loss of the electrical steel sheet pieces 140 more effectively in the model of Group B3 than the model of Group B2. That is, according to this verification test, it was confirmed that, when the width dimension d1 was 60% or less with respect to the interval dimension d2, it was possible to minimize the iron loss, and when the width dimension d1 was 43% or less with respect to the interval dimension d2, it was possible to further minimize the iron loss.

Since the ratio of the width dimension d1 to the interval dimension d2 was different for each of Group B1, Group B2 and Group B3, preferable ranges of the angle α were different from each other. The iron loss inhibition rate Rt in Table 2 was preferably −8% or less as one standard.

In the model of Group B1, the width dimension d1 was 150% with respect to the interval dimension d2. Comparing respective models in Group B1, only in the stator core of Model No. B7 in which the angle α formed by the first direction D1 and the rolling direction RD was set to 90°, the iron loss was less than −8%. That is, it was confirmed that, when the width dimension d1 was 150% with respect to the interval dimension d2, if the angle α was set to 90°, it was possible to significantly and sufficiently minimize deterioration of the iron loss. Here, even if the angle α changed by about ±5°, there was no significant change in the iron loss. In addition, even if the ratio of the width dimension d1 to the interval dimension d2 changed by about ±5%, there was no significant change in the iron loss. Therefore, it can be said that, when the width dimension d1 was 150%±5% with respect to the interval dimension d2, if the angle α was set to 85° or more, it was possible to sufficiently minimize deterioration of the iron loss.

In the model of Group B2, the width dimension d1 was 60% with respect to the interval dimension d2. Comparing respective models in Group B2, in the stator cores of Model Nos. B12, 13, and 14 in which the angle α formed by the first direction D1 and the rolling direction RD was 60° or more, the iron loss was less than −8%. That is, it was confirmed that, when the width dimension d1 was 60% with respect to the interval dimension d2, if the angle α was set to 60° or more, it was possible to sufficiently minimize deterioration of the iron loss. As described above, even if the ratio of the width dimension d1 to the interval dimension d2 changed by about ±5%, there was no significant change in the iron loss. Therefore, it can be said that, when the width dimension d1 was 60%±5% with respect to the interval dimension d2, if the angle α was set to 60° or more, it was possible to significantly and sufficiently minimize deterioration of the iron loss.

In the model of Group B3, the width dimension d1 was 43% with respect to the interval dimension d2. Comparing respective models in Group B3, in the stator cores of Model Nos. B18, 19, 20, and 21 in which the angle α formed by the first direction D1 and the rolling direction RD was 45° or more, the iron loss was less than −8%. That is, it was confirmed that, when the width dimension d1 was 43% with respect to the interval dimension d2, if the angle α was set to 45° or more, it was possible to sufficiently minimize deterioration of the iron loss. As described above, even if the ratio of the width dimension d1 to the interval dimension d2 changed by about ±5%, there was no significant change in the iron loss. Therefore, it can be said that, when the width dimension d1 was 43%±5% with respect to the interval dimension d2, if the angle α was set to 60° or more, it was possible to significantly and sufficiently minimize deterioration of the iron loss.

As shown in Table 2, the mockup of Group B1 had better drop strength than the mockups of Group B2 and Group B3. In the mockup of Group B1, the width dimension d1 of the adhesion part was larger than the interval dimension d2, and in the mockups of Group B2 and Group B3, the width dimension d1 of the adhesion part was smaller than the interval dimension d2. Accordingly, it was confirmed that, also in the split core, when the width dimension d1 of the adhesion part was larger than the interval dimension d2 between the adhesion parts adjacent to each other in the second direction D2, it was possible to increase the adhesion strength.

INDUSTRIAL APPLICABILITY

According to the present invention, it is possible to improve magnetic properties. Therefore, the industrial applicability is high.

BRIEF DESCRIPTION OF THE REFERENCE SYMBOLS 10, 110 Electric motor
21, 121 Stator core (laminated core)
22, 122 Core back part
23, 123 Tooth part
40 Electrical steel sheet
41, 141, 241 Adhesion part
124, 124X Core block
140 Electrical steel sheet piece
D1 First direction
D2 Second direction
d1 Width dimension
d2 Interval dimension
RD Rolling direction
α Angle

The invention claimed is:

1. A laminated core, comprising:
a plurality of electrical steel sheets stacked to each other; and
a plurality of adhesion parts that are provided between the electrical steel sheets adjacent to each other in a stacking direction and adhere the electrical steel sheets to each other,
wherein, when viewed in the stacking direction,
the plurality of adhesion parts are formed in a belt shape that extends in a first direction which is a direction in which the plurality of adhesion parts extend,
the plurality of adhesion parts are arranged in a second direction orthogonal to the first direction, and
an angle formed by the first direction and a rolling direction of the electrical steel sheet is 30° or more and 90° or less.

2. The laminated core according to claim 1,
wherein the angle formed by the first direction and the rolling direction of the electrical steel sheet is 52.3° or more.

3. The laminated core according to claim 1,
wherein a width dimension of the adhesion part is smaller than an interval dimension between the adhesion parts adjacent to each other in the second direction.

4. The laminated core according to claim 3,
wherein the width dimension of the adhesion part is 67%±5% with respect to the interval dimension between the adhesion parts adjacent to each other in the second direction.

5. The laminated core according to claim 4,
wherein the angle formed by the first direction and the rolling direction of the electrical steel sheet is 75°±5°.

6. The laminated core according to claim 1,
wherein the width dimension of the adhesion part is larger than the interval dimension between the adhesion parts adjacent to each other in the second direction.

7. The laminated core according to claim 6,
wherein the width dimension of the adhesion part is 167%±5% with respect to the interval dimension between the adhesion parts adjacent to each other in the second direction, and
wherein the angle formed by the first direction and the rolling direction of the electrical steel sheet is 85° or more.

8. The laminated core according to claim 6,
wherein the width dimension of the adhesion part is 233%±5% with respect to the interval dimension between the adhesion parts adjacent to each other in the second direction, and
wherein the angle formed by the first direction and the rolling direction of the electrical steel sheet is 85° or more.

9. The laminated core according to claim 1,
wherein an average thickness of the adhesion parts is 1.0 μm to 3.0 μm.

10. The laminated core according to claim 1,
wherein an average tensile modulus of elasticity E of the adhesion parts is 1,500 MPa to 4,500 MPa.

11. The laminated core according to claim 1,
wherein the adhesion part is a room temperature adhesion type acrylic-based adhesive containing SGA made of an elastomer-containing acrylic-based adhesive.

12. An electric motor, comprising the laminated core according to claim 1.

13. A laminated core, comprising:
a plurality of electrical steel sheets stacked to each other; and
a plurality of adhesion parts that are provided between the electrical steel sheets adjacent to each other in a stacking direction and adhere the electrical steel sheets to each other,
wherein, when viewed in the stacking direction,
the plurality of adhesion parts are formed in a belt shape that extends in a first direction,
the plurality of adhesion parts are arranged in a second direction orthogonal to the first direction, and
a width dimension of the adhesion part is 368% or less with respect to an interval dimension between the adhesion parts adjacent to each other in the second direction,
wherein an angle formed by the first direction and a rolling direction of the electrical steel sheet is configured to minimize a compressive stress applied by the plurality of adhesion parts to the electrical sheets.

14. A core block that constitutes a laminated core by linking a plurality of the core blocks in a ring shape, comprising:
a plurality of electrical steel sheet pieces stacked to each other; and
a plurality of adhesion parts that are provided between the electrical steel sheet pieces adjacent to each other in a stacking direction and adhere the electrical steel sheet pieces to each other,
wherein, when viewed in the stacking direction,
the plurality of adhesion parts are formed in a belt shape that extends in a first direction which is a direction in which the plurality of adhesion parts extend,
the plurality of adhesion parts are arranged in a second direction orthogonal to the first direction, and
an angle formed by the first direction and a rolling direction of the electrical steel sheet piece is 45° or more and 90° or less.

15. The core block according to claim 14,
wherein the angle formed by the first direction and the rolling direction of the electrical steel sheet piece is 52.3° or more.

16. The core block according to claim 14, comprising
an arc-shaped core back part and a tooth part that protrudes from the core back part in a radial direction of the core back part,
wherein the tooth part extends in the rolling direction.

17. The core block according to claim 14,
wherein the width dimension of the adhesion part is smaller than an interval dimension between the adhesion parts adjacent to each other in the second direction.

18. The core block according to claim 17,
wherein the width dimension of the adhesion part is 60% or less with respect to the interval dimension between the adhesion parts adjacent to each other in the second direction.

19. The core block according to claim 18,
wherein the width dimension of the adhesion part is 43% or less with respect to the interval dimension between the adhesion parts adjacent to each other in the second direction.

20. The core block according to claim 18,
wherein the width dimension of the adhesion part is 43%±5% with respect to the interval dimension between the adhesion parts adjacent to each other in the second direction, and
wherein the angle formed by the first direction and the rolling direction of the electrical steel sheet piece is 45° or more.

21. The core block according to claim 17,
wherein the width dimension of the adhesion part is 60%±5% with respect to the interval dimension between the adhesion parts adjacent to each other in the second direction, and
wherein the angle formed by the first direction and the rolling direction of the electrical steel sheet piece is 60° or more.

22. The core block according to claim 14,
wherein the width dimension of the adhesion part is larger than the interval dimension between the adhesion parts adjacent to each other in the second direction.

23. The core block according to claim 22,
wherein the width dimension of the adhesion part is 150%±5% with respect to the interval dimension between the adhesion parts adjacent to each other in the second direction, and
wherein the angle formed by the first direction and the rolling direction of the electrical steel sheet piece is 85° or more.

24. The core block according to claim 14,
wherein an average thickness of the adhesion parts is 1.0 μm to 3.0 μm.

25. The core block according to claim 14,
wherein an average tensile modulus of elasticity E of the adhesion parts is 1,500 MPa to 4,500 MPa.

26. The core block according to claim 14,
wherein the adhesion part is a room temperature adhesion type acrylic-based adhesive containing SGA made of an elastomer-containing acrylic-based adhesive.

27. A laminated core formed by linking the plurality of core blocks according to claim 14 in a ring shape.

* * * * *